(12) United States Patent
Saiki et al.

(10) Patent No.: US 6,208,237 B1
(45) Date of Patent: Mar. 27, 2001

(54) ELECTRO-MECHANICAL AND ACOUSTIC TRANSDUCER FOR PORTABLE TERMINAL UNIT

(75) Inventors: Shuji Saiki, Uda-gun; Sawako Usuki, Kobe; Mitsukazu Kuze, Osaka, all of (JP)

(73) Assignee: Matsushita Electric Industrial Co. Ltd., Osaka-Fu (JP)

( * ) Notice: Subject to any disclaimer, the term of this patent is extended or adjusted under 35 U.S.C. 154(b) by 0 days.

(21) Appl. No.: 08/979,746

(22) Filed: Nov. 26, 1997

(30) Foreign Application Priority Data

Nov. 29, 1996 (JP) .................................................. 8-318966
Jun. 11, 1997 (JP) .................................................. 9-154117
Jun. 13, 1997 (JP) .................................................. 9-156304

(51) Int. Cl.⁷ ...................................................... G08B 3/00
(52) U.S. Cl. .................................. 340/388.1; 340/311.1; 381/396; 381/151
(58) Field of Search ............................ 340/388.1, 311.1; 381/192, 194, 193, 151, 396

(56) References Cited

U.S. PATENT DOCUMENTS

| | | | |
|---|---|---|---|
| 4,675,907 | 6/1987 | Itagaki et al. | 381/152 |
| 5,172,092 | 12/1992 | Nguyen et al. | 340/311 |
| 5,524,061 | 6/1996 | Mooney et al. | 381/151 |
| 5,528,697 | 6/1996 | Saito | 381/192 |
| 5,546,069 | 8/1996 | Holden et al. | 340/407.1 |
| 5,554,096 | 9/1996 | Ball . | |

FOREIGN PATENT DOCUMENTS

| | | | |
|---|---|---|---|
| 92121580 | 12/1992 | (EP) . | |
| 93309005 | 11/1993 | (EP) . | |
| 59-14491 | 1/1984 | (JP) | H04R/9/02 |
| 59-94997 | 5/1984 | (JP) | H04R/9/02 |
| 60-145778 | 9/1985 | (JP) | H04R/1/02 |
| 61-21699 | 1/1986 | (JP) | H04B/9/00 |
| 3-274832 | 12/1987 | (JP) | H04B/7/26 |
| 4-145874 | 5/1992 | (JP) | H02N/2/00 |
| 4-129199 | 11/1992 | (JP) | H10K/9/13 |
| 5-206989 | 8/1993 | (JP) | H04K/1/00 |
| 558192 | 11/1993 | (JP) . | |
| 6-62483 | 3/1994 | (JP) | H04R/1/00 |
| 7-57159 | 3/1995 | (JP) | G08B/6/00 |
| 7-140984 | 6/1995 | (JP) | G10K/9/122 |
| 7-154884 | 6/1995 | (JP) | H04R/1/00 |
| 8-206599 | 8/1996 | (JP) | B06B/1/04 |
| 8-331694 | 12/1996 | (JP) | H04R/17/00 |
| 9-70571 | 3/1997 | (JP) | B06B/1/04 |
| 9-233798 | 9/1997 | (JP) | H02K/33/02 |
| WO92/19018 | 10/1992 | (WO) . | |

Primary Examiner—Julie Lieu
(74) Attorney, Agent, or Firm—Sheridan Ross P.C.

(57) ABSTRACT

The present invention purposes to realize an electro-mechanical and acoustic transducer capable of generating both strong vibration and sound. In an electro-mechanical and acoustic transducer of the present invention, mass of a mechanical vibration system of the electro-mechanical and acoustic transducer is increased by attaching a weight to a magnetic circuit unit or integrated the weight with the magnetic circuit unit, whereby large vibration is obtained from the electro-mechanical and acoustic transducer.

76 Claims, 21 Drawing Sheets

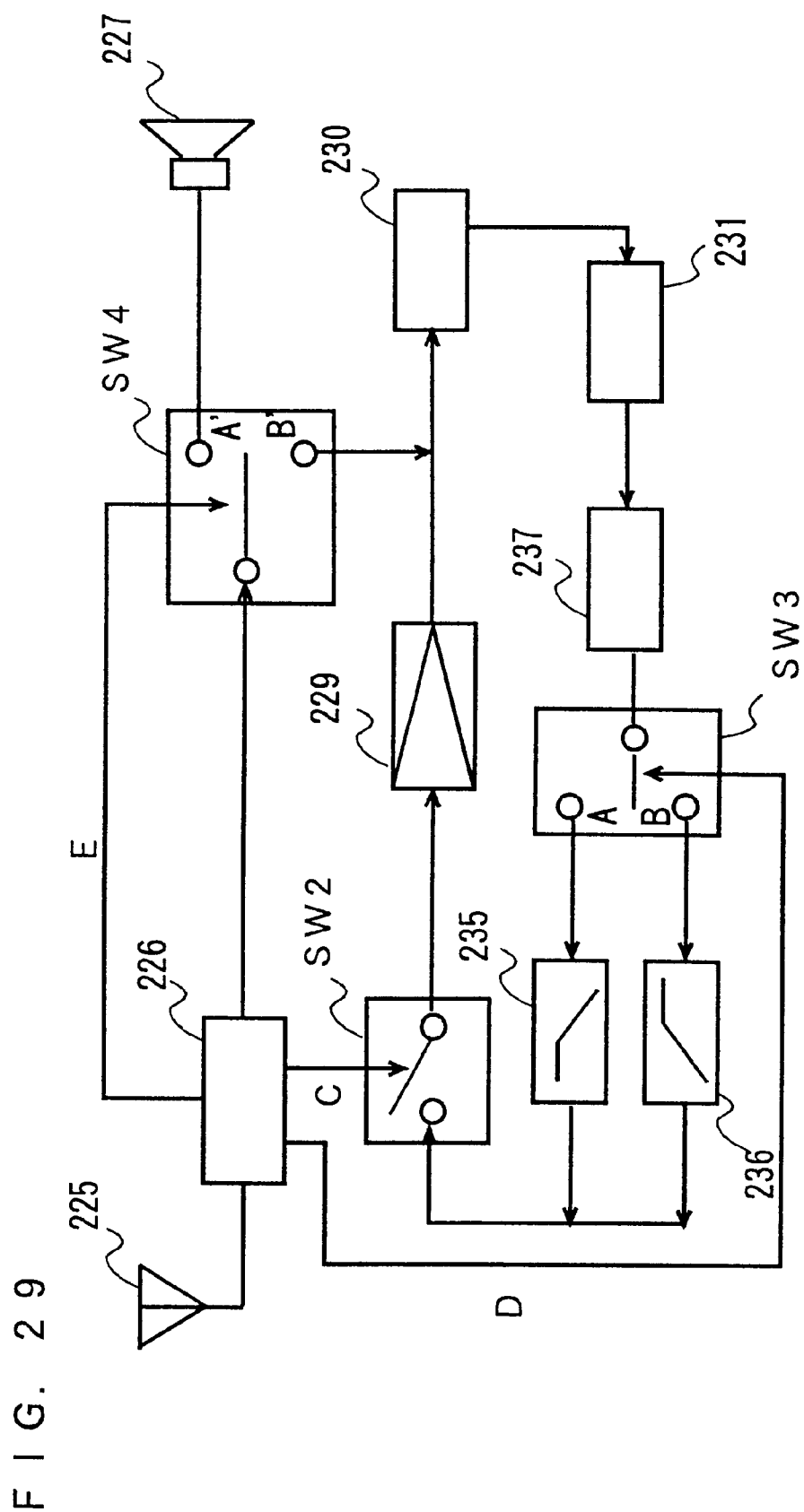

ELECTRO-MECHANICAL AND ACOUSTIC TRANSDUCER FOR PORTABLE TERMINAL UNIT

BACKGROUND OF THE INVENTION

The present invention relates to an electro-mechanical and acoustic transducer for a portable terminal unit which can generate both vibration and sound by an alternating electric signal and a portable terminal unit in which the transducer is built. The portable terminal unit is, for instance, a portable telephone unit, a pager and a computer having a transmitter and a receiver, and the portable terminal unit performs communication with other distant unit on being carried with the user or placed in the vicinity of the user.

Conventionally, in a portable terminal unit such as a portable telephone unit, a small-size sound generator for generating bell sound and a micrometer for generating vibration to which a weight is attached tilting relative to axis of rotation are provided independently as means for informing the user of an incoming call.

In order to reduce the size and weight of the portable terminal unit, for the purpose of reducing the number of units, a prior art electro-mechanical and acoustic transducer of which generates both sound and vibration in a single unit has been devised and disclosed in Japanese Laid-open Utility Model Publication Number H5-85192.

In the prior art, when an alternating electric signal is input to a voice coil of the electro-mechanical and acoustic transducer, a force acts between the voice coil and a magnetic circuit unit. Since the electric signal which is input to the voice coil is electric signal of alternating current, the magnitude of the force varies with frequency of the alternating current. Consequently, a magnet held by a suspension is vibrated by the force acting on the magnetic circuit unit. This vibration is transmitted to a case through the suspension. As a result, the case vibrates.

The magnitude of vibration of mechanical vibration system is proportional to the sum of the masses of the magnet and the suspension of the mechanical vibration system. Since the mass of the suspension is small, the magnitude of vibration susbstantially depends on the mass of the magnet. However, since the mass of the magnet is not sufficient, the sufficient magnitude of vibration is not obtained form the mechanical vibration system even when the frequency of the electric signal which is input to the voice coil coincides with the resonance frequency of the mechanical vibration system. Therefore, when the electro-mechanical and acoustic transducer is provided in the portable telephone unit with a mass as much as 150 g, it is difficult to inform the user of the incoming call with sufficiently strong vibration.

BRIEF SUMMARY OF THE INVENTION

An object of the present invention is to realize a small-size electro-mechanical and acoustic transducer which can generate both large vibration force and sound level.

To achieve the above-mentioned object, an electro-mechanical and acoustic transducer according to the present invention comprises a diaphragm, a magnetic circuit unit disposed so as to oppose to the diaphragm, a weight integrated with the magnetic circuit unit or attached to the magnetic circuit unit as a separate part, at least one suspension for holding a moving unit including the magnetic circuit unit and the weight, a holding member for holding the diaphragm and the suspension, and a driving unit for generating a force to drive the diaphragm and the magnetic circuit unit. The magnetic circuit unit includes a magnet, a plate and a yoke, and the driving unit is an electrodynamic unit which generates a driving force by means of a voice coil inserted in a magnetic gap of the magnetic circuit unit and fixed to the diaphragm at its one end. According to another aspect of the present invention, the magnetic circuit unit includes a magnet and a plate having a center pole, and the driving unit is an electromagnetic unit which generates a magnetic force between an exciting coil disposed on the periphery of the center pole and the diaphragm of a magnetic substance disposed with a gap with the magnetic circuit unit. For example, in the case of the electrodynamic unit, the weight is disposed on the periphery of the yoke. In the case of the electromagnetic unit, the weight is disposed on the periphery of the plate.

By the above-mentioned configuration, an electro-mechanical and acoustic transducer which can generate large vibration is realized. In the electro-mechanical and acoustic transducer, the mechanical vibration system is formed with the moving unit and the suspension, and the magnitude of vibration power of the mechanical vibration system is proportional to the product of the mass and the acceleration of the mechanical vibration system. In the electro-mechanical and acoustic transducer, since the weight is attached to the magnetic circuit unit integrally with or as separate part, the mass of the mechanical vibration system increases. Consequently, the electro-mechanical and acoustic transducer can generate large vibration. Since the electrodynamic unit and the electromagnetic unit, respectively, vibrate the diaphragm with vibrating the moving unit including the magnetic circuit unit and the weight, the electro-mechanical and acoustic transducer can generate sound.

In order to increase the mass of the mechanical vibration system, it is preferable that the weight attached to the magnetic circuit unit as a separate part made of a material having a specific gravity higher than at least iron.

In order to increase the mass of the mechanical vibration system and to prevent the magnetic flux generated by the magnet from being magnetically saturated, in the case of the electrodynamic unit, it is preferable that the yoke integrated with the weight has a magnetic flux passing portion formed so that the magnetic flux generated by the magnet is not magnetically saturated and the magnetic path is substantially formed and a weight portion for increasing the mass of the magnetic circuit unit. In the case of the electromagnetic unit, it is preferable that the plate has a magnetic flux passing portion formed so that the magnetic flux generated by the magnet is not magnetically saturated and the magnetic path is substantially formed and a weight portion for increasing the mass of the magnetic circuit unit.

The magnetic circuit unit in the case of being engaged and integrated with the weight, or the weight in the case of being engaged and attached with the magnetic circuit unit as a separate part may be rectangular. In this case, the mass of the mechanical vibration system can be increased without the dimensions of the electro-mechanical and acoustic transducer being increased.

In the case of the electrodynamic unit, in order to prevent the voice coil and the magnetic circuit unit from coming into contact with each other hence breaking the voice coil, it is preferable that the width of the magnetic gap of the magnetic circuit unit be larger than the maximum amplitude of the voice coil or the moving unit.

In order that the moving unit vibrates stably, it is preferable to hold the moving unit by disposing the suspensions at two positions on the diaphragm side of the moving unit and on the distal side of the moving unit to the diaphragm.

An electro-mechanical and acoustic transducer in accordance with the present invention comprises a diaphragm, a magnetic circuit unit disposed so as to be opposed to the diaphragm and including a yoke integrated with a weight, a magnet and a plate, a first suspension having a pair of fixing portions and fixed to a diaphragm side of the magnetic circuit unit, a second suspension having a pair of fixing portions and fixed to a distal side of the magnetic circuit unit to the diaphragm so as to be disposed in different positions from the fixing portions of the first suspension, a holding member connected to the diaphragm, having two openings and having four receiving portions connected to the fixing portions of the first and second suspension, a voice coil inserted in a magnetic gap of the magnetic circuit unit and fixed to the diaphragm, and a baffle disposed at one of the openings of the holding member.

By the above-mentioned configuration, an electro-mechanical and acoustic transducer which can generate vibration is realized. In the above-mentioned electro-mechanical and acoustic transducer, the magnetic circuit unit and the suspensions constitute the mechanical vibration system, and the magnitude of vibration power of the mechanical vibration system is proportional to the product of the mass and the acceleration of the mechanical vibration system. In the above-mentioned electro-mechanical and acoustic transducer, since the weight is integrated with the magnetic circuit unit, the mass of the mechanical vibration system increases. Consequently, the electro-mechanical and acoustic transducer can generate large vibration. Since the voice coil is connected to the diaphragm, the electro-mechanical and acoustic transducer can generate sound. In order to dispose the suspension at two positions on the diaphragm side of the magnetic circuit unit and on the distal side of the magnetic circuit unit to the diaphragm, the magnetic circuit unit vibrates stably.

By constructing the suspension of an arc shape so as to be situated on the periphery of the magnetic circuit unit, the length of the suspension can be increased, the therefore, linearity of displacement characteristics of the suspension is ensured and the suspension is used sufficiently within the limit of resilience. Accordingly, the durability of the electro-mechanical and acoustic transducer is improved.

As the suspension, that which has a thin plate shape with the width of the central portion being smaller than that of the end portions may be used. A first example of the suspension has a thin-plate shape in which the width substantially continuously decreases from the end portions to the central portion. Another example is that which has a thin plate shape with the width linearly and continuously decreasing from the end portions to the central portion. A still another example is that which has a uniform width in the central portion which is smaller than the width of the end portions. Such suspensions can enjoy dispersions of stress, which have been concentrated to the fixing portions at both ends in the conventional suspension having a uniform width, and that the linearity of displacement characteristics is sufficiently ensured.

It is preferable that the magnetic circuit unit have a shape substantially coinciding with the deformation by vibration of the suspension at the maximum permissible amplitude of the magnetic circuit unit.

By constructing the magnetic gap of the magnetic circuit unit by setting the distance between the periphery of the magnetic circuit unit and the baffle or the holding member so as to be smaller than the distance between the voice coil and the magnetic circuit unit, the voice coil and the diaphragm are prevented from being broken due to collision between the magnetic circuit and the voice coil when the electro mechanical and acoustic transducer is accidentally dropped.

An electro-mechanical and acoustic transducer unit in accordance with the present invention comprises the above-mentioned electro-mechanical and acoustic transducer, an electric signal generator for outputting to the electro-mechanical and acoustic transducer at least two electric signal having different frequency or frequency range, and switch for switching electric signal of the electric signal generator. The electric signal generator generates an electric signal for informing an incoming call by vibration and an electric signal for informing an incoming call by sound. Alternatively, the electric signal generator generates an electric signal for informing an incoming call by vibration, an electric signal for informing an incoming call by sound and an electric signal for reproducing an received voice. It is preferable that frequency of the electric signal for informing an incoming call by vibration is substantially 130 Hz, frequency of the electric signal for informing an incoming call by sound is 1 kHz or higher, and frequency of the electric signal for reproducing an received voice is substantially 200 Hz or higher.

It is preferable that frequency of electric signal or center frequency of frequency band generated by the electric signal generator coincide with resonance frequency of the mechanical vibration system of the electro-mechanical and acoustic transducer. It is preferable that frequency of electric signal or center frequency of frequency band generated by the electric signal generator coincide with resonance frequency of vibration of the diaphragm.

An electro-mechanical and acoustic transducer unit of another aspect of the present invention comprises the above-mentioned electro-mechanical and acoustic transducer, a detector for detecting a resonance frequency of the electro-mechanical and acoustic transducer and an electric signal generator for outputting to the electro-mechanical and acoustic transducer an electric signal having the resonance frequency detected by the detector. For example, the detector detects a resonance frequency of the mechanical vibration system of the electro-mechanical and acoustic transducer.

An electro-mechanical and acoustic transducer unit of still other aspect of the present invention comprises the above-mentioned electro-mechanical and acoustic transducer, an electric signal generator for outputting an electric signal including a resonance frequency of the electro-mechanical and acoustic transducer, a detector for detecting a signal at a resonance frequency of the electro-mechanical and acoustic transducer, and an amplifier for amplifying an input signal from the detector and outputting amplifying signal to the electro-mechanical and acoustic transducer.

An electro-mechanical and acoustic transducer unit of the still other aspect of the present invention comprises the above-mentioned electro-mechanical and acoustic transducer, a detector for detecting a signal at a resonance frequency of the electro-mechanical and acoustic transducer, and an amplifier for amplifying a noise and an input signal from the detector and outputting amplifying signal to the electro-mechanical and acoustic transducer.

By thus constructing the electro-mechanical and acoustic transducer, the electro-mechanical and acoustic transducer can be realized which can generate stably both vibration and sound even when the resonance frequency of the electro-mechanical and acoustic transducer changes due to a change in environment where the electro mechanical acoustic transducer is placed.

The portable terminal unit embodying the present invention has the above-mentioned electro-mechanical and acoustic transducer unit mounted therein and the electro-mechanical and acoustic transducer unit is attached to the outside case or the circuit board of the portable terminal unit.

According to the present invention, by comprising the only electro-mechanical and acoustic transducer unit, a portable terminal unit which can generate both vibration and sound (ring, voice, acoustic sound, etc.) is realized.

BRIEF DESCRIPTION OF THE SEVERAL VIEWS OF THE DRAWING

FIG. 29 is a block diagram in which an electric signal is input to an electro-mechanical and acoustic transducer according to a fifteenth embodiment.

DETAILED DESCRIPTION OF THE INVENTION

Embodiments of the present invention will hereinafter be described with reference to the drawings.

First Embodiment

Figure 1:
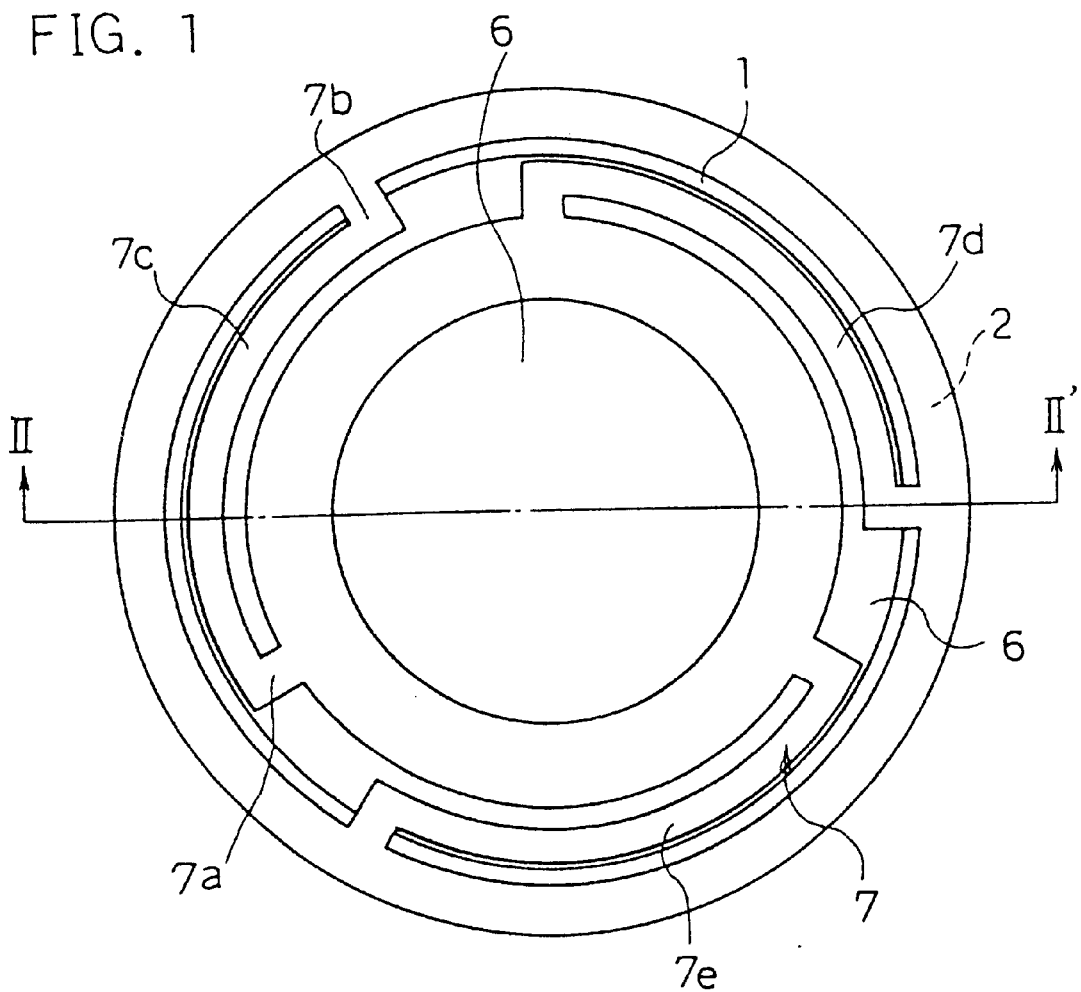
FIG. 1 is a plane view of an electro-mechanical and acoustic transducer according to a first embodiment.
Figure 2:
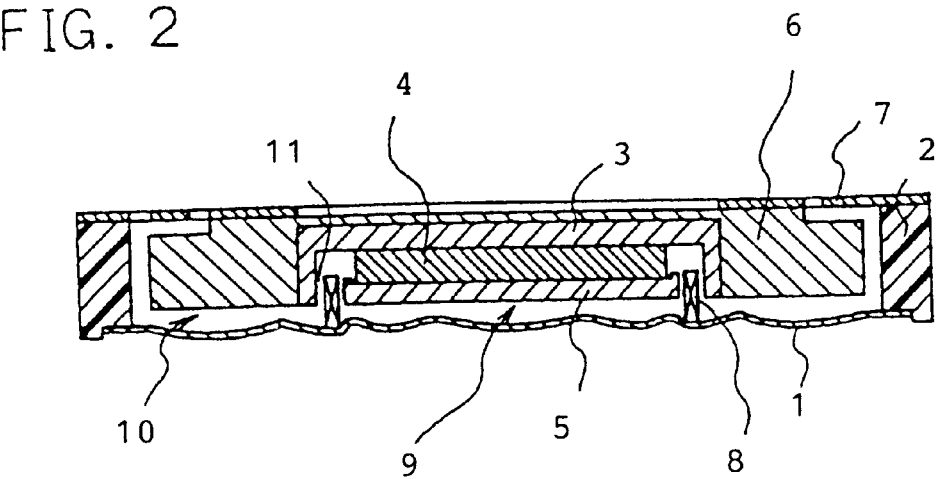
FIG. 2 is a cross-sectional view taken on the line II–II' of the electro-mechanical and acoustic transducer of FIG. 1.

An electro-mechanical and acoustic transducer according to a first embodiment will be described with reference to FIGS. 1 and 2. FIG. 1 is a plane view of the electro-mechanical and acoustic transducer. FIG. 2 is a cross-sectional view taken on the line II–II' of the electro-mechanical and acoustic transducer of FIG. 1.

The electro-mechanical and acoustic transducer is constructed as follows.

A diaphragm 1 is fixed to a ring-shaped holding member 2 made of a plastic material on the periphery thereof. The diaphragm 1 is a thin film made of titanium or polycarbonate and having a thickness of approximately 10 $\mu$m to 50 $\mu$m. It is preferable to use a glass-reinforced plastic material having an excellent shock-resistance property as the holding member 2.

A yoke 3 is made of a ferromagnetic material such as soft iron and has a short cylindrical peripheral portion and a bottom portion. A magnet 4 is made of a permanent magnet such as of ferrite or of neodymium and has a disk shape and is fixed to the bottom portion of the yoke 3 with adhesive. A plate 5 is made of a ferromagnetic material and has a disk shape and is fixed to the face of the diaphragm 1 side of the magnet 4. The yoke 3, the magnet 4 and the plate 5 constitute a magnetic circuit unit 9. A weight 6 is fixed so as to surround the bottom surface and the peripheral surface of the yoke 3. The weight 6 and the magnetic circuit unit 9 constitute a moving unit 10 which vibrates relatively to the holding member 2. The inner surface of the yoke 3 and the peripheral surface of the plate 5 form a magnetic gap 11. A cylindrical voice coil 8 is inserted in the magnetic gap 11 and has its one end fixed to the diaphragm 1.

A suspension 7 has three arc shaped arms 7c, 7d and 7e being formed in arc shapes with common center of circles of curvatures to the outer circumference of the holding member 2. An end 7a of the suspension 7 is fixed to the weight 6 and the other end 7b thereof is fixed to the holding member 2. The suspension 7 and the moving unit 10 constitute mechanical vibration system. The number of arms of the suspension 7 may be two or more. However, in order to prevent the moving unit 10 from tilting, it is preferable that the number of arms of the suspension 7 is three or more as the arms 7a, 7b and 7c shown in the figure.

With respect to the electro-mechanical and acoustic transducer thus constructed, an operation thereof will be described.

An electric signal, for instance, an alternating current is input to the voice coil 8. By the alternating current flowing to the voice coil 8, a driving force is generated between the voice coil 8 and the magnetic circuit unit 9. The magnitude of the force generated between the voice coil 8 and the magnetic circuit unit 9 varies responding to the alternating current. Consequently, the force varying in magnitude responding to the alternating current acts on the moving unit 10 including the magnetic circuit unit 9 held by the suspension 7, so that the moving unit 10 vibrates. The vibration of the moving unit 10 is transmitted to the holding member 2 through the suspension 7, so that the holding member 2 vibrates. Thus, the electro-mechanical and acoustic transducer generates vibration.

A force varying in magnitude according to the alternating current acts on the voice coil 8. By the force, the diaphragm 1 is vibrated to which the voice coil 8 is fixed. The diaphragm 1 generates sound when being vibrated by a signal of the audible frequency range. Thus, the electro-mechanical and acoustic transducer generates sound.

When the frequency of the electric signal which is input to the voice coil 8 coincides with the resonance frequency of the mechanical vibration system formed by the moving unit 10 and the suspension 7 of the electro-mechanical and acoustic transducer, the mechanical vibration system vibrates the most largely, the vibration from the electro-mechanical and acoustic transducer becomes largest. The above-mentioned resonance frequency is set at 200 Hz or lower.

The magnitude of vibration of the mechanical vibration system of the electro-mechanical and acoustic transducer is proportional to the product of the mass and the acceleration of the moving unit 10 of the mechanical vibration system. In the electro-mechanical and acoustic transducer according to the first embodiment, the moving unit 10 is formed by attaching the weight 6 to the magnetic circuit unit 9. Therefore, the mass of the mechanical vibration system is large, so that this electro-mechanical and acoustic transducer generates larger vibration than the conventional electro-mechanical and acoustic transducers of the same size.

When a material, for instance, copper, tantalum or tungsten having a specific gravity higher than iron is used as material of the weight 6, the mass of the mechanical vibration system can be further increased without increase of the dimensions of the electro-mechanical and acoustic transducer. Consequently, the electro-mechanical and the conventional acoustic transducer generates still larger vibration than the conventional electro-mechanical and acoustic transducers of the same size.

When the frequency of the current which is input to the voice coil 8 includes a frequency of 200 Hz or higher, the moving unit 10 does not substantially vibrate because the frequency range is out of resonance frequency of the mechanical vibration system formed by the moving unit 10 and the suspension 7, and the diaphragm 1 vibrates at an audible frequency in response thereto, so that the electro-mechanical and acoustic transducer generates sound.

Thus, an electro-mechanical and acoustic transducer which can generate both vibration and sound by the same unit is realized.

Second Embodiment

Figure 3:
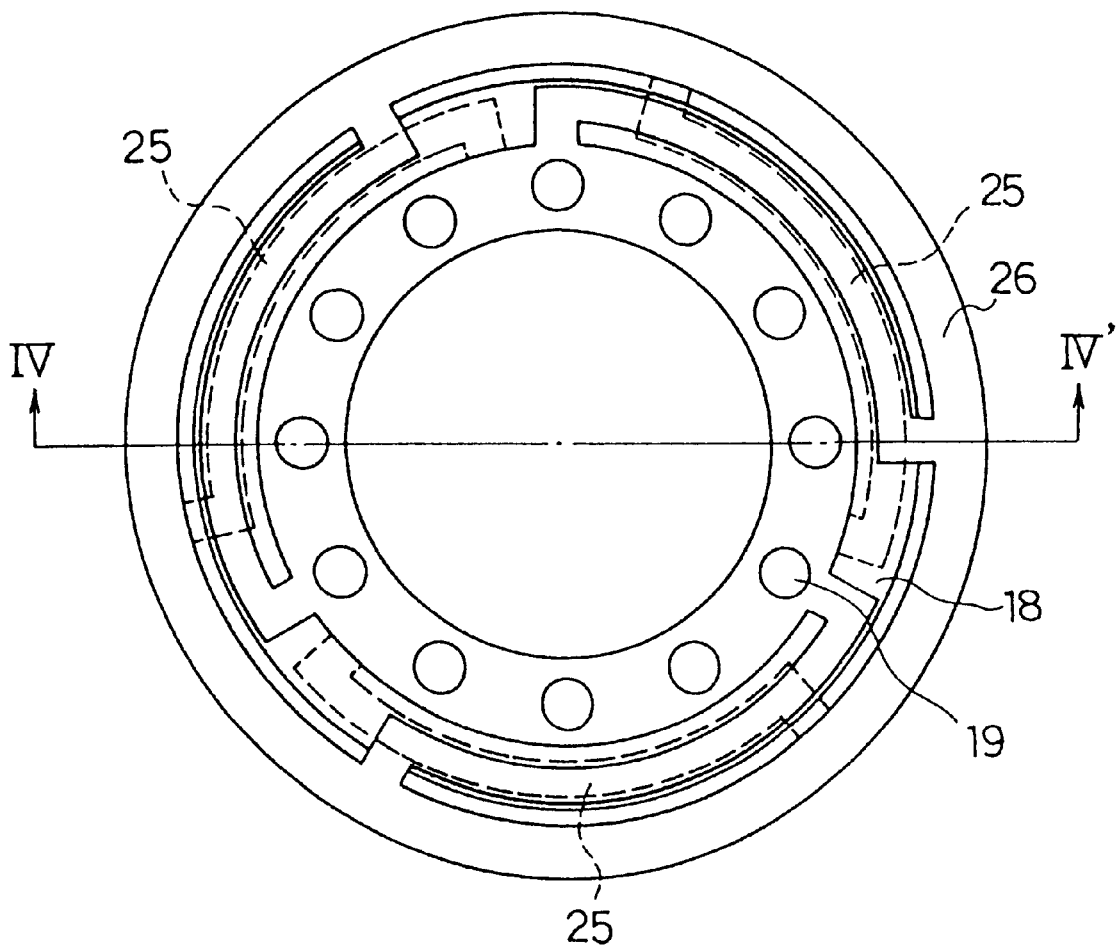
FIG. 3 is a plane view of an electro-mechanical and acoustic transducer according to a second embodiment.
Figure 4:
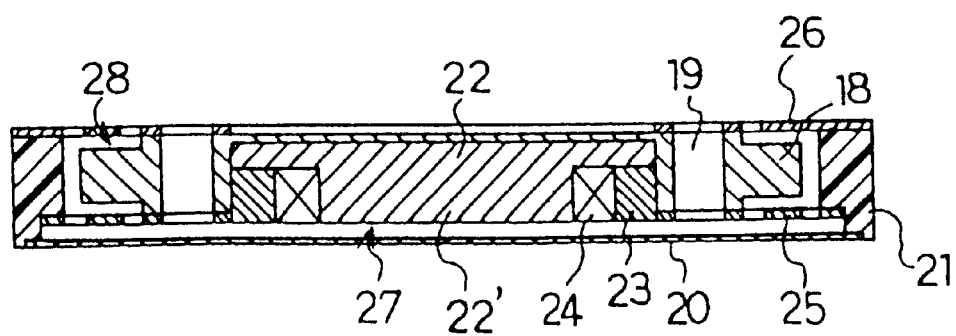
FIG. 4 is a cross-sectional view taken on the line IV–IV' of the electro-mechanical and acoustic transducer of FIG. 3.

An electro-mechanical and acoustic transducer according to a second embodiment will be described with reference to FIGS. 3 and 4. FIG. 3 is a plane view of the electro-mechanical and acoustic transducer. FIG. 4 is a cross-sectional view taken on the line IV–IV' of the electro-mechanical and acoustic transducer of FIG. 3.

The electro-mechanical and acoustic transducer is constructed as follows.

A diaphragm 20 is fixed to a holding member made of plastic on the periphery thereof. The diaphragm 20 is a plate having a thickness of approximately 0.1 mm to 0.2 mm and made of a material having high permeability such as Permalloy. It is preferable to use a glass-reinforced material having an excellent shock-resistance property as the holding member 21.

A plate 22 is made of a ferromagnetic material and is disposed in a position opposed to the diaphragm 20 and has a center pole 22' in a central portion. A magnet 23 is made of a permanent magnet such as of ferrite or of neodymium and has a ring shape and is fixed to the plate 22. An exciting coil 24 is inserted between the center pole 22' of the plate 22 and the magnet 23 and attached to the center pole 22' of the plate 22. The plate 22, the magnet 23 and the exciting coil 24 constitute a magnetic circuit unit 27. A weight 18 is fixed onto the peripheral surfaces of the plate 22 and the magnet 23. The weight 18 has an air vent 19 in the axial direction. The weight 18 and the magnetic circuit unit 27 constitute a moving unit 28 which relatively vibrates to the holding member 21. Suspensions 25 and 26 have three arc shaped arms being formed in arc shapes with common center of circles of curvatures to the outer circumference of the holding member 21. The suspension 26 has its one end fixed to the distal side (upper side) of the eight 18 to the diaphragm 20 and has its other end fixed to the holding member 21. The suspension 25 has its one end fixed to the diaphragm 20 side of the weight 18 and has its other end fixed to the holding member 21 so that the direction of its arms is opposite to that of the arms of the suspension 26 in the plane view (FIG. 3). The suspension 25 and 26 and the moving unit 28 constitute a mechanical vibration system. The counter line of the suspension 25 exists immediately under the contour line of the suspension 26, and both lines overlap when illustrated on a plane view. From this fact, these lines are slightly deviated from each other for illustration purpose.

With respect to the electro-mechanical and acoustic transducer thus constructed, an operation thereof will be described.

An electric signal such as an alternating current is input to the exciting coil 24. Since the current which is input to the exciting coil 24 is an alternating current, the magnitude of the attraction force generated by an electromagnetic force between the diaphragm 20 and the magnetic circuit unit 27 varies responding to the alternating current. Since the attraction force varying in magnetic responding to the alternating current acts on the moving unit 28 including the magnetic circuit unit 27 held by the suspensions 25 and 26, the moving unit 28 vibrates. The vibration of the moving unit 28 is transmitted to the holding member 21 through the suspensions 25 and 26, so that the holding member 21 vibrates.

Thus, the electro-mechanical and acoustic transducer generates vibration.

A attraction force varying in magnitude responding to the alternating current acts on the diaphragm 20 as a reactive force of the above-mentioned attraction force. By the attraction force, the diaphragm 20 is vibrated. The diaphragm 20 generates sound when being vibrated at an audible frequency. Thus, the electro-mechanical and acoustic transducer generates sound.

When the frequency of the electric signal which is input to the exciting coil 24 coincides with the resonances frequency of the mechanical vibration system formed by the moving unit 28 and the suspensions 25 and 26 of the electro-mechanical and acoustic transducer, the mechanical vibration system vibrates most, so that the vibration from the electro-mechanical and acoustic transducer becomes largest. The above-mentioned resonance frequency is set at 200 Hz or lower.

The magnitude of vibration of the mechanical vibration system of the electro-mechanical and acoustic transducer is proportional to the product of the mass and the acceleration of the moving unit 28 of the mechanical vibration system. In the electro-mechanical and acoustic transducer according to the second embodiment, the moving unit 28 is formed by attaching the weight 18 to the magnetic circuit unit 27. Therefore, the mass of the mechanical vibration system is large, so that this electro-mechanic and acoustic transducer generates larger vibration than the conventional electro-mechanical and acoustic transducers of the same size.

When a material, for instance, copper, tantalum or tungsten having a specific gravity higher than iron is used as material of the weight 18, the mass of the mechanical vibration system can be further increased without increase of the dimensions of the electro-mechanical and acoustic transducer. Consequently, the electro-mechanical and acoustic transducer generates still larger vibration than the conventional electro-mechanical and acoustic transducers of the same size.

When the frequency of the current which is input to the exciting coil 24 is a frequency of 200 Hz or higher, the moving unit 28 does not substantially vibrate because the frequency range is out of the resonance frequency of the mechanical vibration system formed by the moving unit 28 and the suspensions 25 and 26, and the diaphragm 20 vibrates at an audible frequency in response thereto, so that the electro-mechanical and acoustic transducer generates sound.

Thus, an electro-mechanical and acoustic transducer which can generate both vibration and sound by the same unit is realized.

In the electro-mechanical and acoustic transducer according to the second embodiment, the moving unit 28 is held by the suspensions 25 and 26. Since holding points of the respective suspensions 25 and 26 are detached from each other relative to the direction of the vibration, the moving unit 28 is prevented from tilting due to generation of directional variation in the vibration of the moving unit 28.

Since the weight 18 has the air vent 19, the pressure in vacant space between the diaphragm 20 and the moving unit 28 is prevented from increasing due to the vibration of the moving unit 28 or the diaphragm 20. Consequently, the vibration of the moving unit 28 or the diaphragm 20 is prevented from being curbed by the increase in pressure in the vacant space.

In the second embodiment, suspensions 25 and 26 for holding the moving unit are disposed at two positions. When this is applied to the electro-mechanical and acoustic transducer of the first embodiment, the moving unit is prevented from tilting due to generation of directional variation in the vibration of the moving unit.

In the second embodiment, the weight has the air vent. When this is applied to the electro-mechanical and acoustic transducer of the first embodiment, the vibration of the moving unit or the diaphragm is prevented from being curbed by the increase in pressure in vacant space.

Third Embodiment

Figure 5:
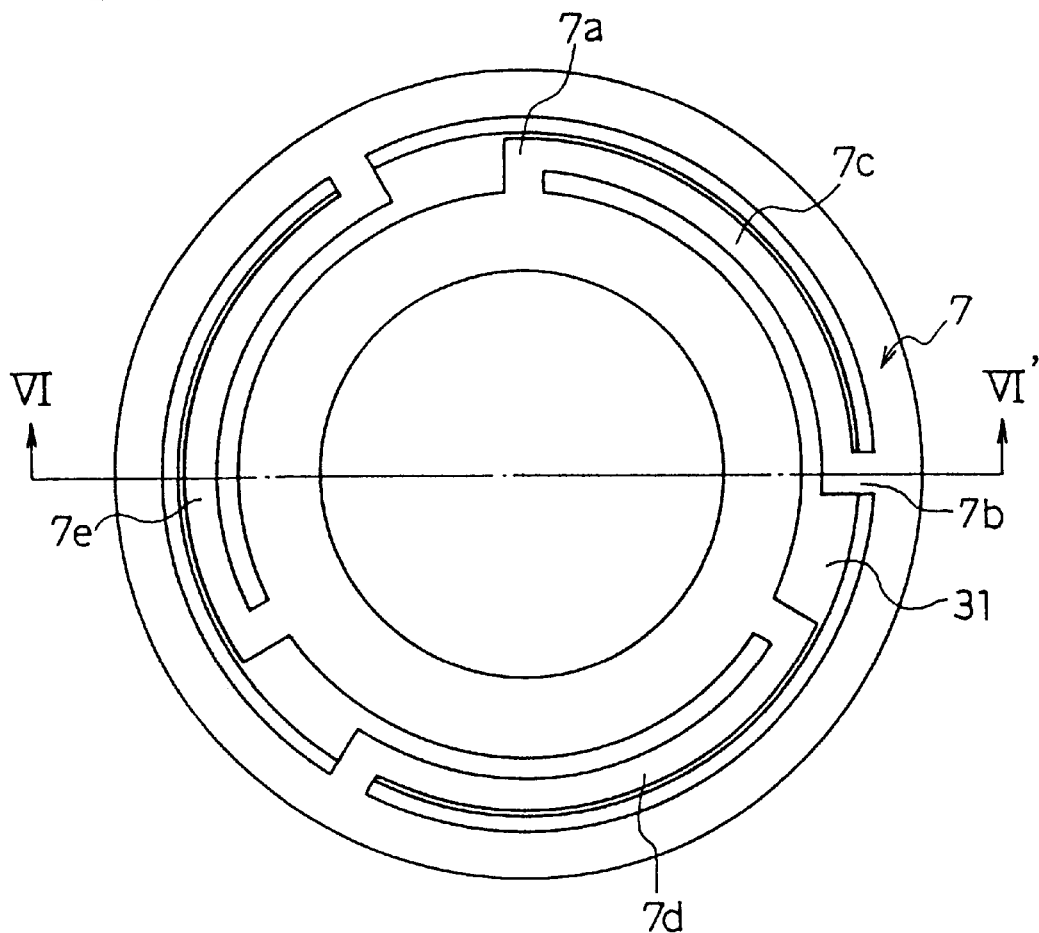
FIG. 5 is a plane view of an electro-mechanical and acoustic transducer according to a third embodiment.
Figure 6:
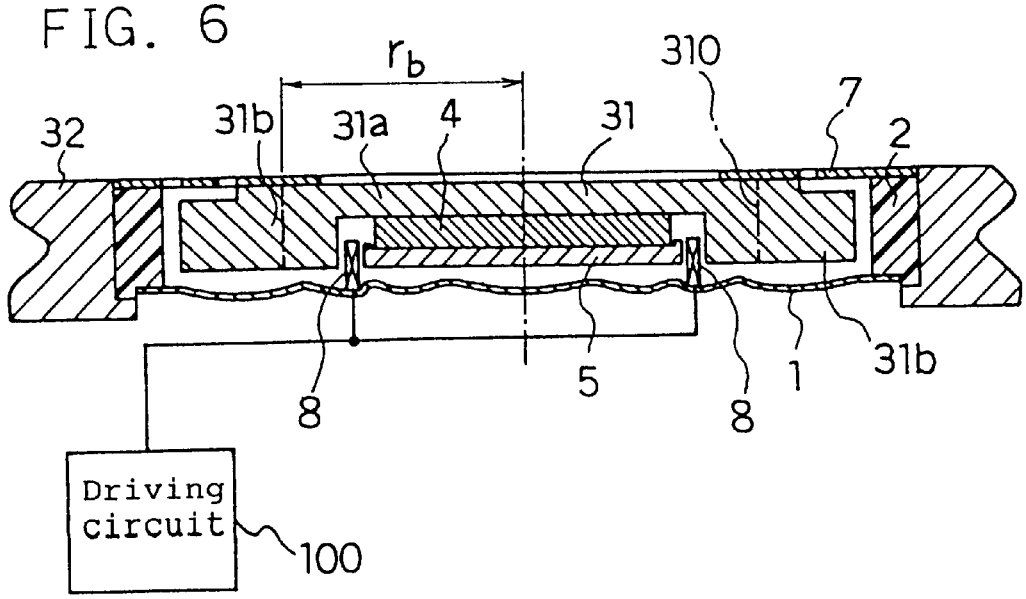
FIG. 6 is a cross-sectional view taken on the line VI–VI' of the electro-mechanical and acoustic transducer of FIG. 5 added the body of a portable terminal unit.
Figure 7:
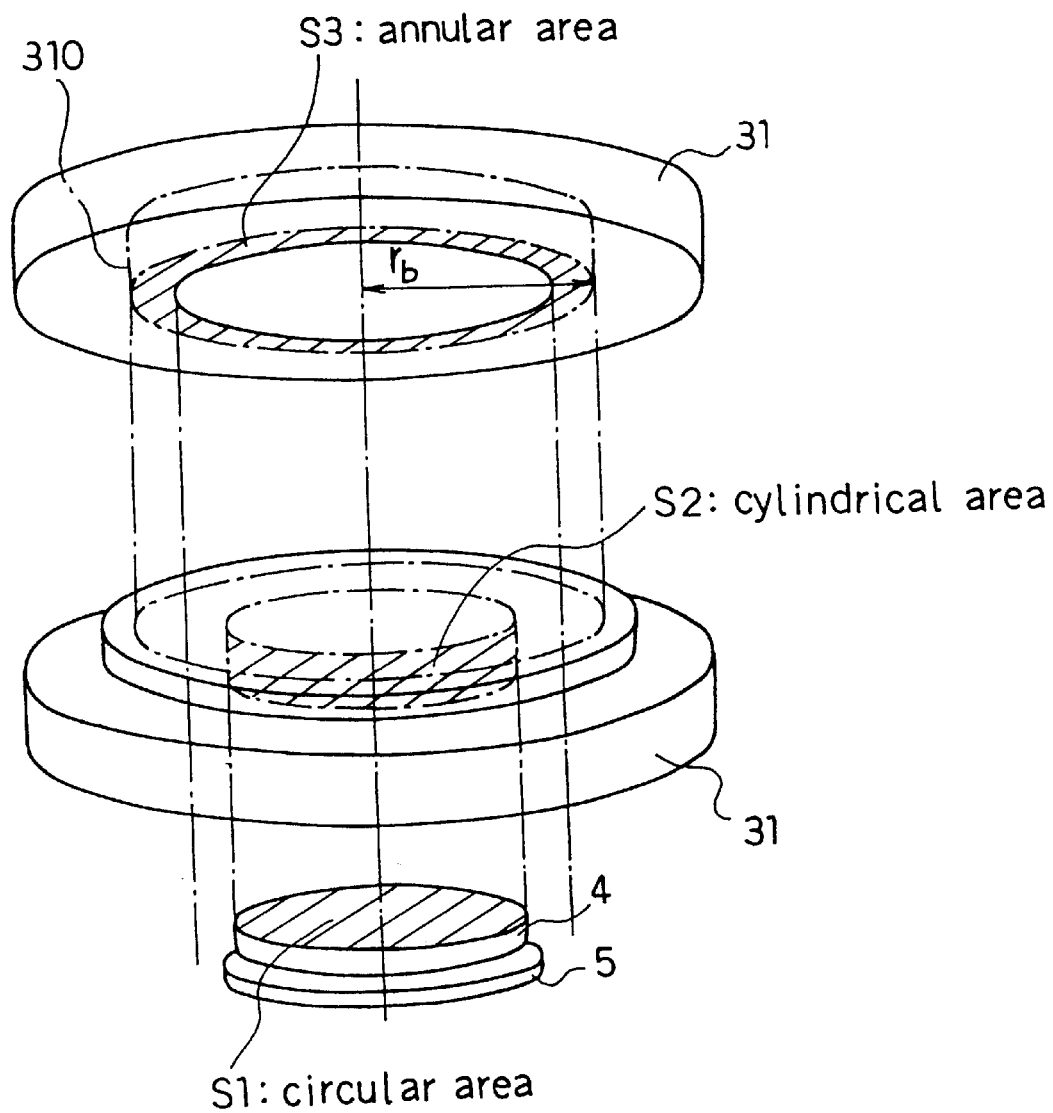
FIG. 7 is a view of assistance in explaining the dimensional relationship between a magnet and a yoke.

An electro-mechanical and acoustic transducer according to a third embodiment will be described with reference to FIGS. 5, 6 and 7. FIG. 5 is a plane view of the electro-mechanical and acoustic transducer. FIG. 6 is a cross-sectional view taken on the line VI–VI' of the electro-mechanical and acoustic transducer of FIG. 5 added a body of a portable terminal unit. FIG. 7 is a view for explaining the dimensional relationship between the yoke and the magnet.

With respect to a configuration of the electro-mechanical and acoustic transducer, only the difference from the electro-mechanical and acoustic transducer of the first embodiment will be described. Corresponding elements and portions with those of the first embodiment are denoted by the same reference numerals and no overlapping description will be given because the description of the first embodiment may be applied.

In the first embodiment, the electro-mechanical and acoustic transducer is formed with the yoke 3 and the weight 6 as separate parts. On the contrary, in the third embodiment, a yoke portion 31a substantially forming the magnetic path of the magnetic circuit unit and a weight portion 31b substantially not forming the magnetic path of the magnetic circuit unit are integrated to form a yoke 31. A driving circuit 100 is for supplying an electric signal to the voice coil 8.

The dimensional relationship between the yoke 31 and the magnet 4 will be described with reference to FIG. 7. In FIG. 7, in order to clearly show the structure of both a bottom surface and a upper surface of the yoke 31, the yoke 31 is shown in both a perspective bottom view and a perspective upper view.

Let us provide that area of a circular face of the magnet 4 is S1, that are of a cylindrical face of a virtual cylinder standing up from a portion where the bottom surface of the yoke 31 is in contact with the upper surface of the magnet to the upper surface of the yoke 31 is S2 and that area of a planar cross section of the cylindrical portion forming an outer pole of the yoke 31 downwardly extending to surround the coil 8 is S3. In order that the magnetic flux generated in the magnet 4 does not magnetically saturated, the yoke 31 has to satisfy the following dimensional relationship. It is necessary to set S2 no less than S1 and to set S3 no less than S2. In the conventional electro-mechanical and acoustic transducer, S2 and S3 substantially coincide with each other. However, in the third embodiment, in order to form the weight portion 31b, S3 is set to be so as to largely exceed S2. Consequently, the portion outside a virtual cylindrical face 310 (of radius $r_b$) providing S3 which is equal to S2 is outside an area necessary for the magnetic saturation of the magnetic flux which is generated by the magnet 4. The portion outside the virtual cylindrical face 310 of radius $r_b$ has been designed as a weight which is not provided yoke of the conventional electro-mechanical and acoustic transducer and has been made integral with the magnetic flux passing portion inside the radius $r_b$.

Description in detail on operation of the electro-mechanical and acoustic transducer thus constructed will be omitted because it is substantially the same as that of the electro-mechanical and acoustic transducer of the first embodiment.

Like in the first embodiment, the electro-mechanical and acoustic transducer of the third embodiment can generate both vibration and sound by the same unit.

When the frequency of the electric signal which is input to the voice coil 8 coincides with the resonance frequency of the mechanical vibration system of the electro-mechanical and acoustic transducer, the mechanical vibration system vibrates the most largely, so that the vibration from the electro-mechanical and acoustic transducer becomes largest.

The magnitude of vibration of the mechanical vibration system of the electro-mechanical and acoustic transducer is proportional to the product of the mass and the acceleration of the moving unit of the mechanical vibration system. In the conventional electro-mechanical and acoustic transducers, since the yoke of the moving unit is limited to the portion substantially forming the magnetic path of the magnetic circuit unit. On the contrary, in the electro-mechanical and acoustic transducer of the third embodiment, the yoke 31 includes the yoke portion 31*a* substantially forming the magnetic path of the magnetic circuit unit and the weight portion 31*b* not forming the magnetic path. Therefore, the mass of the moving unit of the electro-mechanical and acoustic transducer is larger than that of the conventional electro-mechanical and acoustic transducers. Consequently, the electro-mechanical and acoustic transducer can generate larger vibration than the conventional electro-mechanical and acoustic transducers of the same size.

When the electro-mechanical and acoustic transducer is fixed in a body 32 of a portable terminal unit as shown in FIG. 6, the portable terminal unit which has both function of informing the user of an incoming call by vibration and function of generating sound (ring, voice, acoustic sound, etc.) is realized.

Fourth Embodiment

Figure 8:
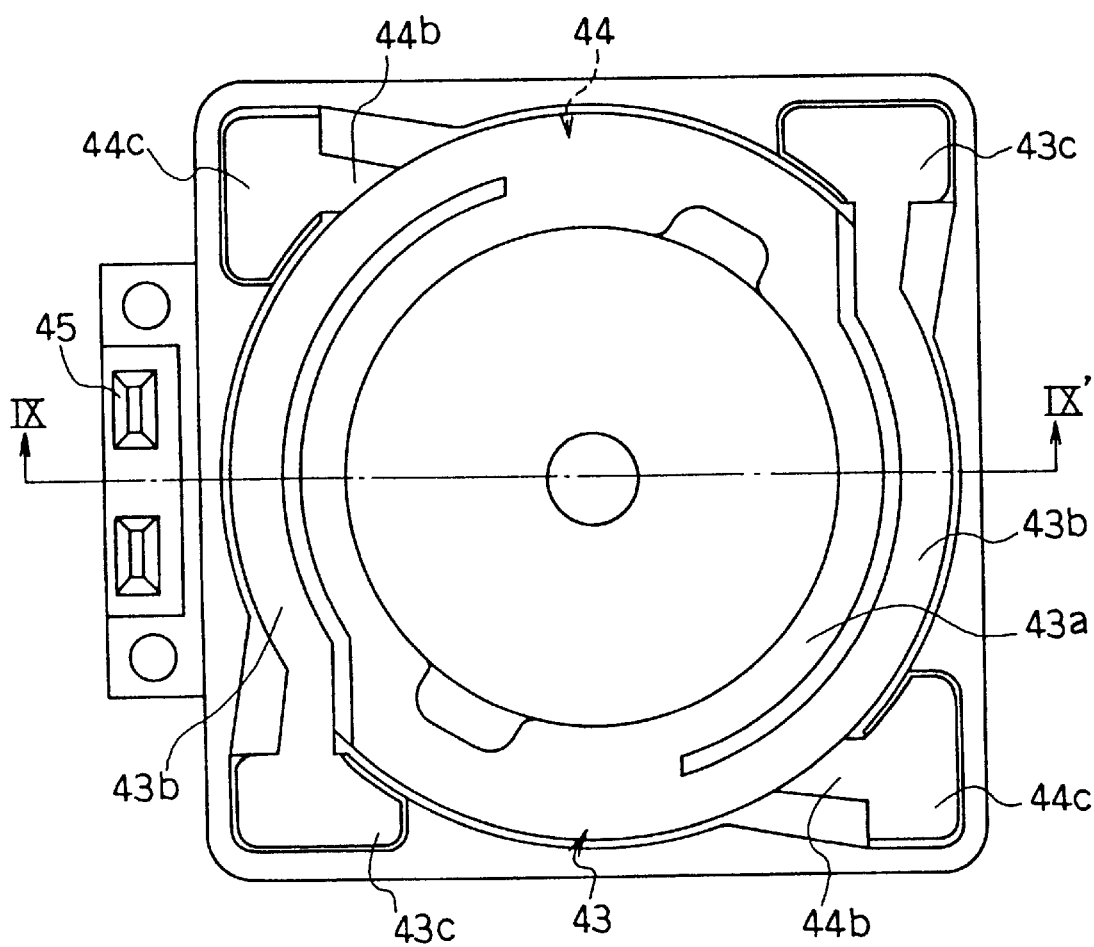
FIG. 8 is a plane view of an electro-mechanical and acoustic transducer according to a fourth embodiment.
Figure 9:
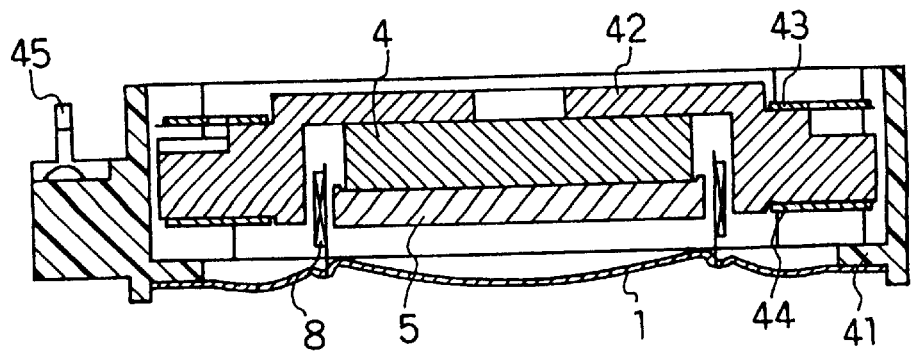
FIG. 9 is a cross-sectional view taken on the line IV–IV' of the electro-mechanical and acoustic transducer of FIG. 8.
Figure 10:
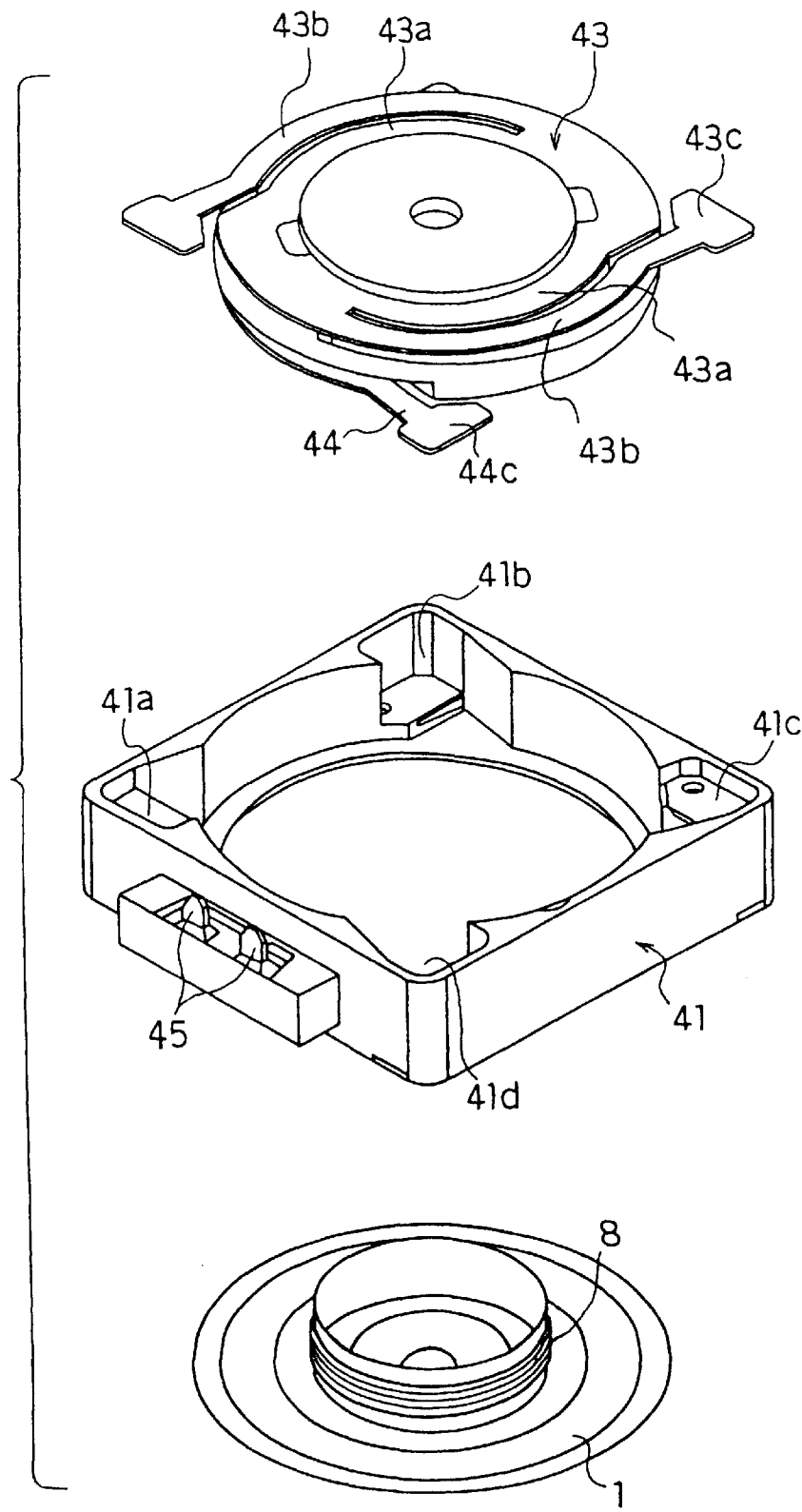
FIG. 10 is an exploded perspective view of the electro-mechanical and acoustic transducer of FIG. 8.

An electro-mechanical and acoustic transducer according to a fourth embodiment will be described with reference to FIGS. 8, 9 and 10. FIG. 8 is a plane view of the electro-mechanical and acoustic transducer. FIG. 9 is a cross-sectional view taken on the line IX–IX' of the electro-mechanical and acoustic transducer of FIG. 8. FIG. 10 is an exploded perspective view of components of the electro-mechanical and acoustic transducer of FIG. 8.

With respect to a configuration of the electro-mechanical and acoustic transducer, only the difference from the electro-mechanical and acoustic transducers of the first and third embodiments will be described. Corresponding elements and portions with those of the first and third embodiments are denoted by the same reference numerals and no overlapping description will be given because the description of the first and third embodiments may be applied.

Like in the third embodiment, a yoke 42 is formed by integrating a yoke portion substantially forming the magnetic path of the magnetic circuit unit and a weight portion substantially not forming the magnetic path of the magnetic circuit unit, and has a circular hole in its bottom surface. The yoke 42 and the magnet 4 are manufactured so as to satisfy the dimensional relationship described in the third embodiment.

A holding member 41 is made of a glass-reinforced material having an excellent shock-resistance property and has a rectangle peripheral portion and is provided with a cylindrical cavity in the center. The holding member 41 has receiving portions 41*a*, 41*b*, 41*c* and 41*d* connected to fixing portions of subsequently-described suspensions. A connection housing, which has an input terminal 45 to which lead wires of the both ends of the voice coil 8 are connected, is attached to a part of the peripheral portion of the holding member 41.

A suspension 43 is made of a resilient matter such as stainless steel or a copper alloy and is a spirally slotted thin plate. The suspension 43 has a frame-shaped holding portion 43*a* fixed to the distal side of the yoke 42 to the diaphragm 1, two arcing arm portions 43*b* and two substantially square fixing portions 43*c* fixed to the receiving portions 41*a* and 41*c* of the holding member 41 and being symmetrical with respect to the center of the suspension 43. A suspension 44 is made of a resilient matter such as stainless steel or a copper alloy and has the same shape as the suspension 43. The suspension 44 has a frame-shaped holding portion fixed to the diaphragm side of the yoke 42, two arcing arm portions 44*b* and two substantially square fixing portions 44*c* fixed to the receiving portions 41*b* and 41*d* of the holding member 41 and being symmetrical with respect to the center of the suspension 44. The suspension 44 is fixed to the holding member 41 in a direction rotated by 90 degrees with respect to the suspension 43. The suspensions 43 and 44 are disposed so as to be fitted on the plane of the moving unit. In order to prevent the yoke 42 from coming into contact with the suspensions 43 and 44 at vibration, the portions of the yoke 42 which are opposite to the arm portions 43*b* of the suspension 43 and the arm portions 44*b* of the suspension 44 are trimmed.

Description in detail on operation of the electro-mechanical and acoustic transducer thus constructed will be omitted because it is substantially the same as that of the electro-mechanical and acoustic transducer of the first embodiment.

Like in the first embodiment, the electro-mechanical and acoustic transducer of the fourth embodiment can generate both vibration and sound with the same unit.

Like in the third embodiment, the yoke 43 of the moving unit includes the yoke portion substantially forming the magnetic path of the magnetic circuit unit and the weight portion not forming the magnetic path. Therefore, the mass of the moving unit is larger than that of the conventional electro-mechanical and acoustic transducers, so that this electro-mechanical and acoustic transducer can generate larger vibration than the conventional electro-mechanical and acoustic transducers of the same size.

The suspensions 43 and 44 have arm portions of an arcing shape in line with the external shape of the moving unit. Therefore, the length of the arm portions of the suspensions 43 and 44 may be increased under a condition that the arm portions fall on the plane of the moving unit. Consequently, the linearity of displacement characteristics of the suspensions is ensured, and this electro-mechanical and acoustic transducer generates larger vibration than the conventional electro-mechanical and acoustic transducers of the same size. Since the arm portions of the suspensions 43 and 44 are long, the displacement at both end portions of the arms portion becomes small, so that the suspensions is prevented from being broken due to material fatigue. In addition, since the arm portions of the suspensions 43 and 44 are disposed to be orthogonal to each other, tilts of vibrations caused when the moving unit vibrates are suppressed.

Fifth Embodiment

Figures 11, 12:
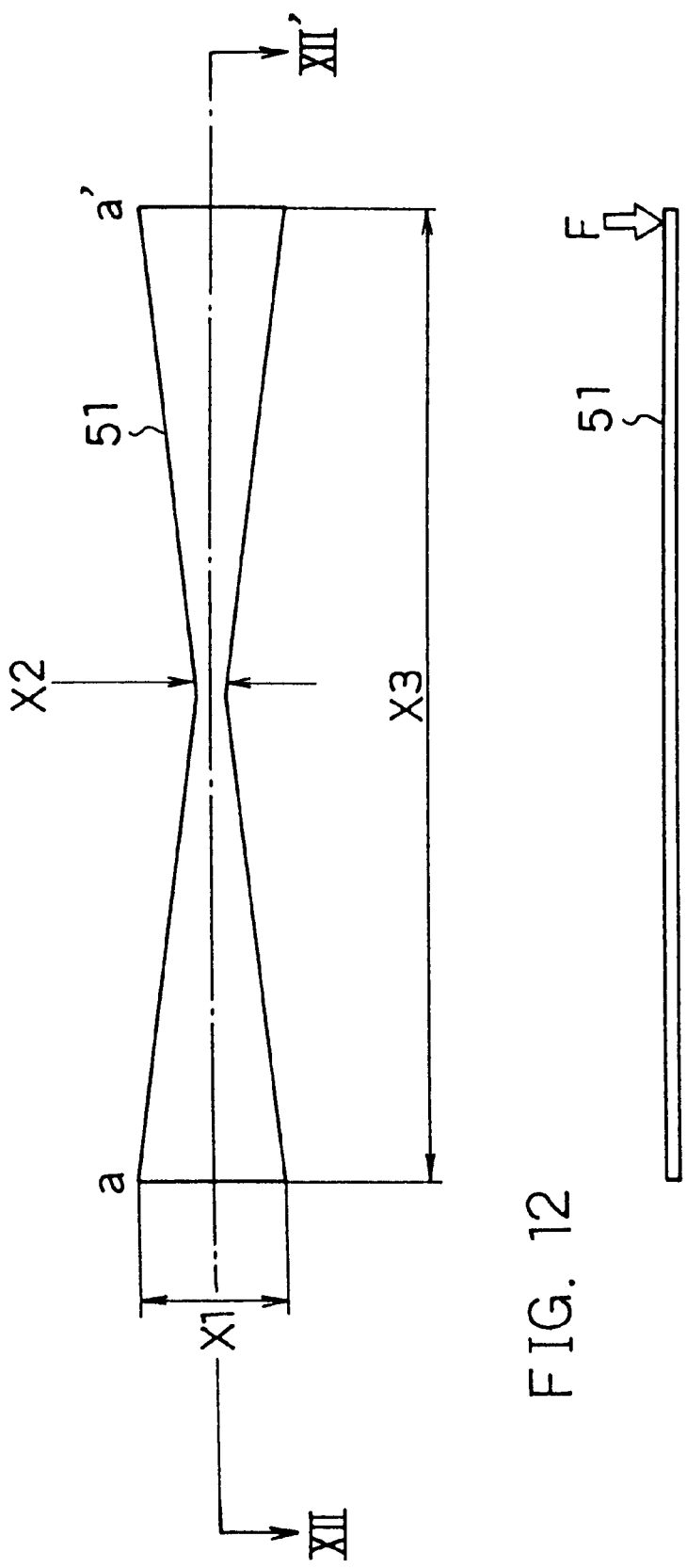
FIG. 11 is a plane view of a suspension according to a fifth embodiment.
FIG. 12 is a cross-sectional view taken on the line XII–XII' of the suspension of FIG. 11.
Figure 13:
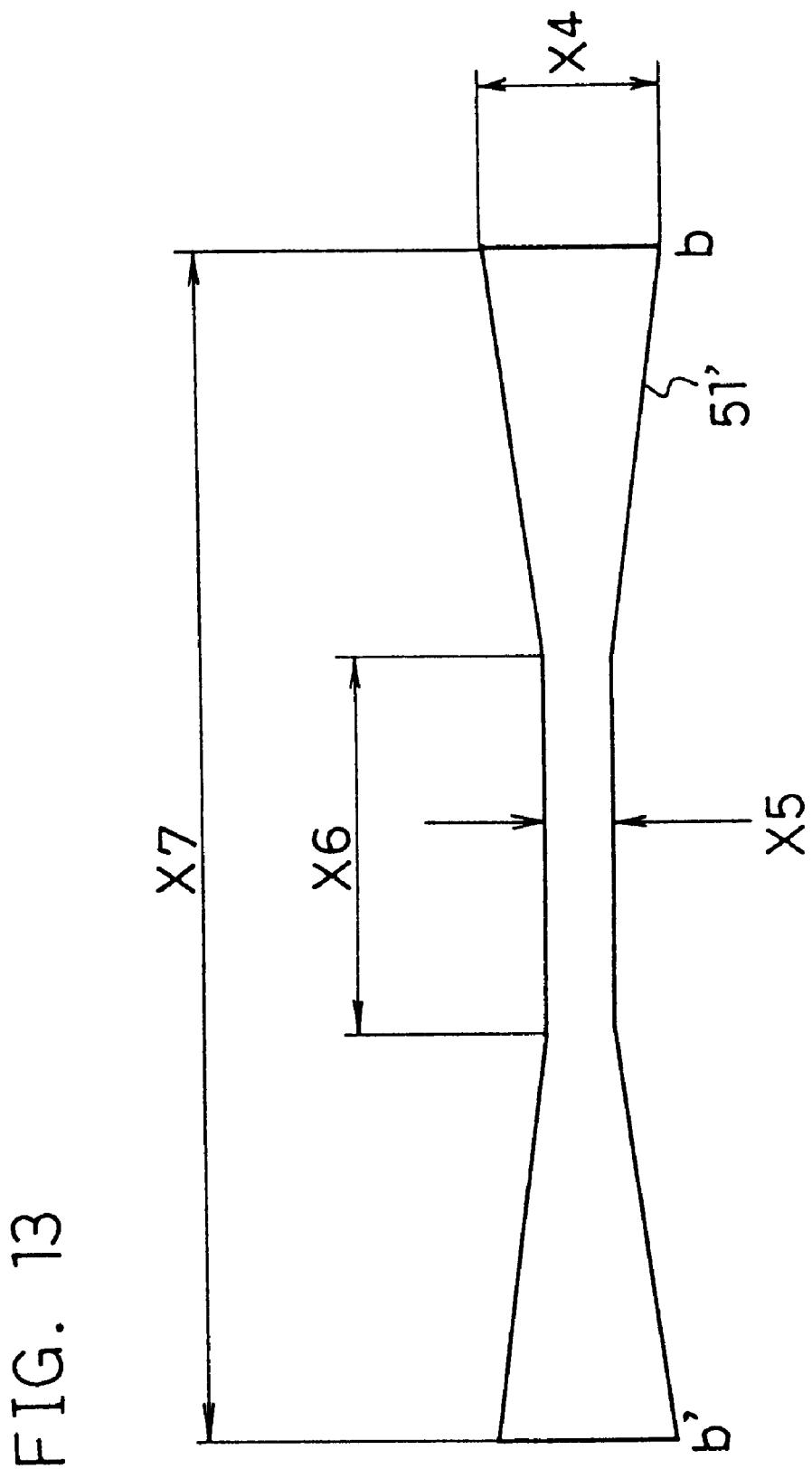
FIG. 13 is a plane view of another suspension.

A suspension according to a fifth embodiment will be described with reference to FIGS. 11, 12 and 13. FIG. 11 is a plane view of the suspension. FIG. 12 is a cross-sectional view taken on the line XII–XII' of the suspension of FIG. 11. FIG. 13 is a plan view of another suspension.

A suspension 51 is a plate spring made of a stainless steel plate with a thickness of, for example, approximately 125 ∞m. The suspension 51 has a form such that the width linearly and continuously decreases from the end portions to the central portion. As an example, when the width of end portions of the suspension 51 is X1, the width of a central portion is X2 and the total length of the suspension 51 is X3, X1 is 1.3 mm, X2 is 0.25 mm and X3 is 8.5 mm.

An end side a of the suspension 51 is fixed and a force F is vertically applied to another end side a' as shown in FIG. 12. The suspension 51 is bent in the direction of the force as the force F increases. The stress distribution on the plate surface under a condition where the suspension 51 is bent will be described by comparing the suspension 51, with a suspension having the same total length as that of the suspension 51 and having a uniform width which is the same as that of the width of the end portions of the suspension 51. In the case of the suspension having a uniform width, stress is concentrated on the end portions. On the contrary, in the suspension 51, since the width of the central portion is smaller than that of the end portions, the portion in the vicinity of the narrow center portion than the wide end portions deforms easily, so that the stress generated in the suspension 51 is dispersed in the direction of the central portion. Therefore, the stress locally generated at the end portions of the suspension 51 is reduced compared with the suspension having a uniform width. In addition, since a suspension is bent easily as width of the suspension decreases, the linearity characteristics for the force F vs. displacement improves compared with the suspension having a uniform width.

Thus, the suspension having a shape such that the width linearly and continuously decreases from the end portions to the central portion may simultaneously achieve both improvement of the linearity characteristics for the force applied to the suspension vs. displacement as well as dissolution of the problem of breakage of the suspension due to material fatigue caused by the locally concentrated stress, and they were regarded as being contradictory to each other in the suspension having a uniform width.

A suspension 51' shown in FIG. 13 is made of stainless steel with a thickness of, for example, 122 μm. The suspension 51' has a shape such that a uniform-width portion is provided in the central portion and the width linearly and continuously decreases from the end portions to its central portion. As an example, let us provide that the width of the end portions of the suspension 51' is X4, the width of the central portion is X5, the length of the uniform-width portion is X6 and the total length is X7, X4 is 1.3 mm, X5 is 0.5 mm, X6 is 2.7 mm and X7 is 8.5 mm.

When the value of X6 is below 2.5 mm, the stress tends to concentrate on the end portions of the suspension. When the value of X6 exceeds 2.9 mm, the stress tends to concentrate on the central portion. For this reason, 2.5 mm to 2.9 mm are suitable for the value of X6 and the optimum value is 2.7 mm.

The suspension 51' has similar effects to the suspension 51 of FIG. 11.

Thus, the suspension having a shape such that the width decreases from the end portions to the central portion can simultaneously achieve both improvement of the linearity of displacement characteristics for the force applied to the suspension and dissolution of the problem of breakage of the suspension due to material fatigue causes by the locally concentrated stress.

Sixth Embodiment

Figure 14:
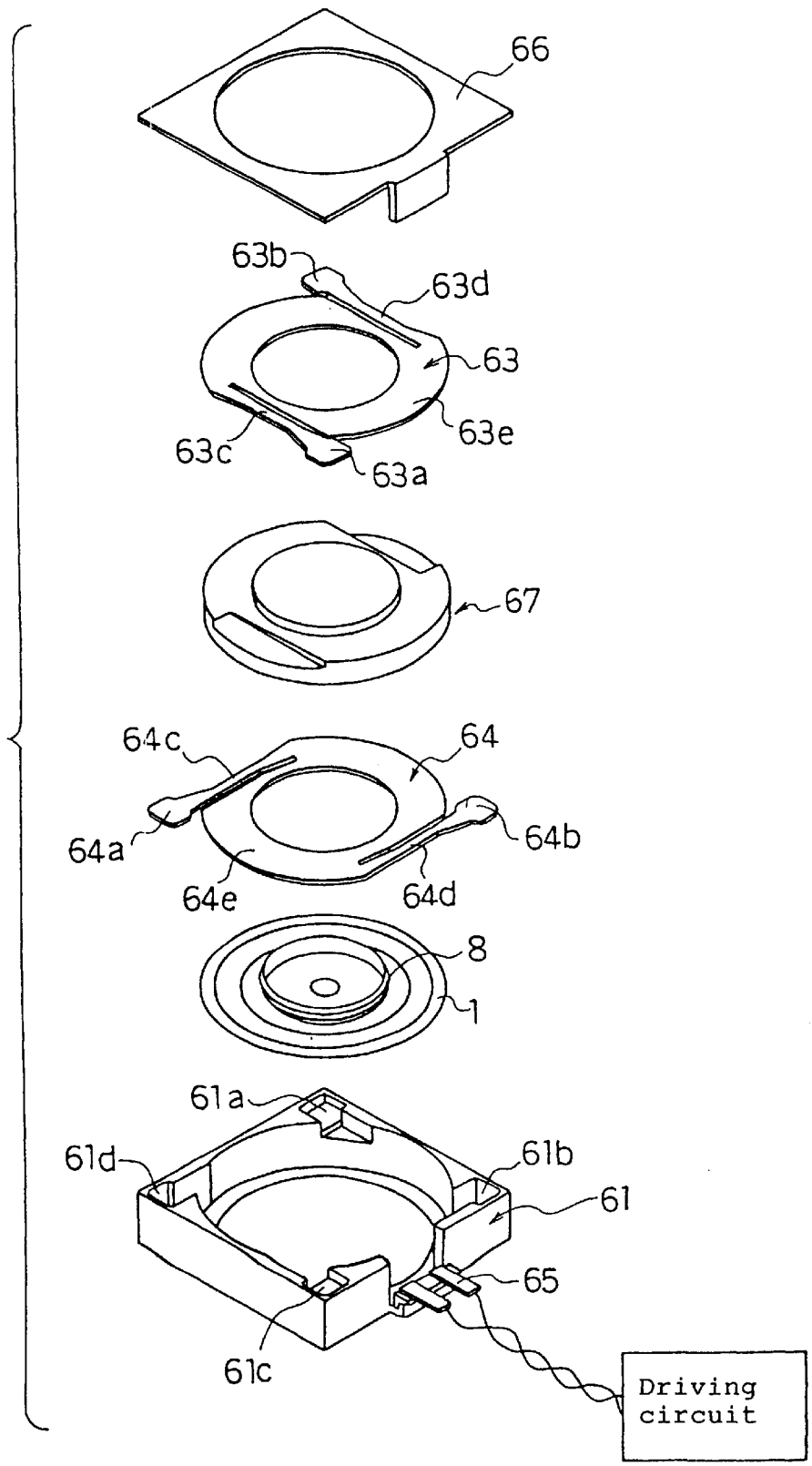
FIG. 14 is an exploded perspective view of an electro-mechanical and acoustic transducer according to a sixth embodiment.
Figure 15:
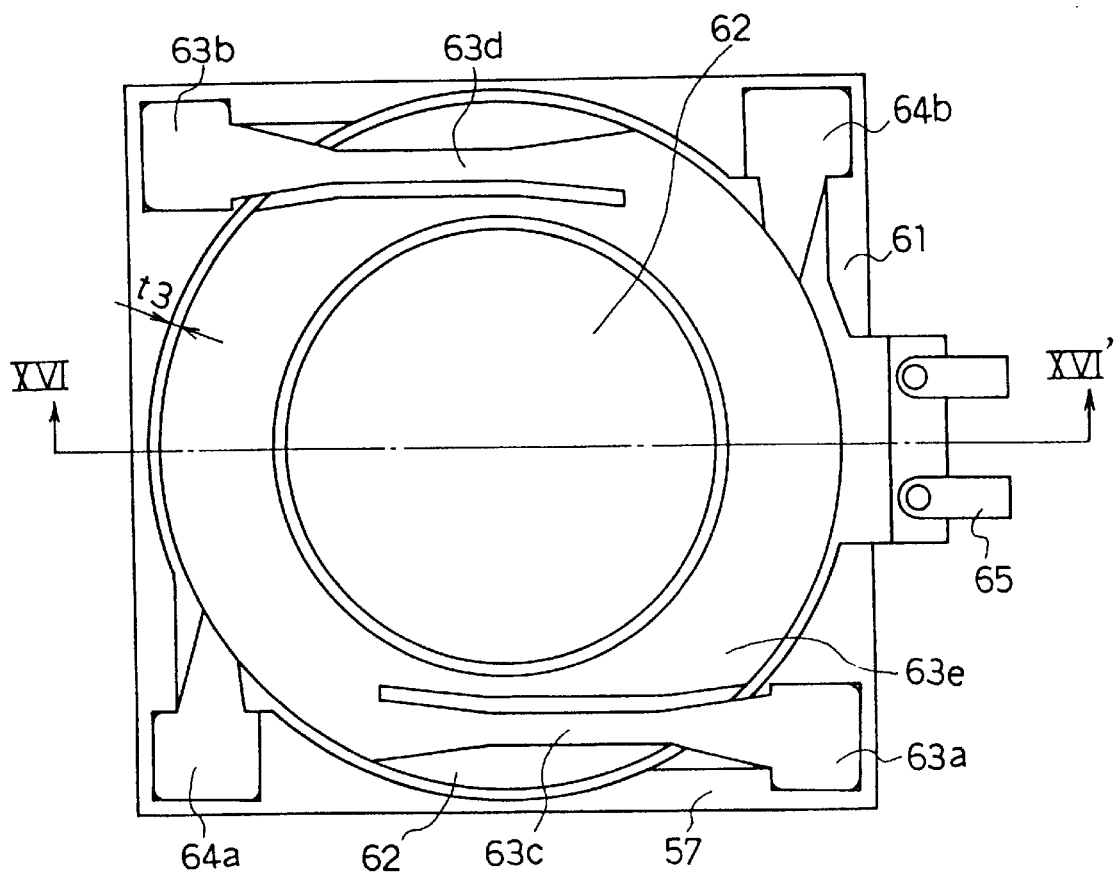
FIG. 15 is a plane view of the electro-mechanical and acoustic transducer of FIG. 14 excepting a baffle.
Figure 16:
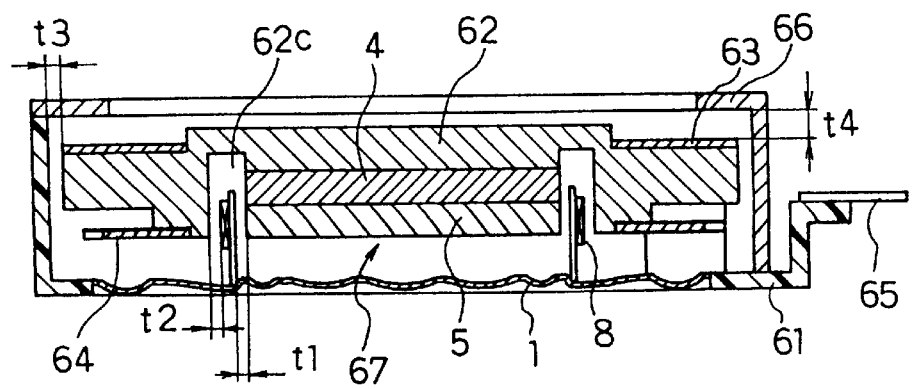
FIG. 16 is a cross-sectional view taken on the line XVI–XVI' of the electro-mechanical and acoustic transducer of FIG. 15 added the baffle.

An electro-mechanical and acoustic transducer according to a sixth embodiment will be described with reference to FIGS. 14, 15 and 16. FIG. 14 is an exploded perspective view of the electro-mechanical and acoustic transducer. FIG. 15 is a plane view of the electro-mechanical and acoustic transducer of FIG. 14 excepting a baffle. FIG. 16 is a cross-sectional view taken on the line XVI–XVI' of the electro-mechanical and acoustic transducer of FIG. 15 added the baffle.

With respect to the configuration of the electro-mechanical and acoustic transducer of the sixth embodiment, only the difference from the electro-mechanical and acoustic transducers of the first and third embodiments will be described. Corresponding elements and portions with those of the first and third embodiments are denoted by the same reference numerals and will not be described because the description of the first and third embodiments may be applied.

A holding member 61 is made of plastic and has a rectangular periphery and is provided with a cylindrical cavity in the center. The holding member 61 has receiving portions 61a, 61b, 61c and 61d connected to fixing portions of subsequently-described suspensions 63 and 64. To a part of the periphery of the holding member 61, a connection housing having an input terminal 65 is attached. To the input terminal 65, the ends of the lead wire of the voice coil 8 are connected. A baffle 66 has a frame shape and is attached to the holding member 61.

A yoke 62 is made of a ferromagnetic material such as soft iron and has a cylindrical peripheral and is provided with a bottom. Like in the third embodiment, the yoke 62 is formed by integrating a yoke portion substantially forming the magnetic path of the magnetic circuit unit and a weight portion substantially not forming the magnetic path of the magnetic circuit unit. Unlike in the third and fourth embodiments, the yoke 62 is provided with a cut portion 62c as shown the cross-sectional view of FIG. 16 in order to prevent the yoke 62 from coming into contact with the voice coil 8. The yoke 62 and the magnet 4 are manufactured so as to satisfy the dimensional relationship described in the third embodiment with reference to FIG. 7.

The suspension 63 is made of a resilient matter such as stainless steel or a copper alloy and is a thin flat plate shape having arm portions 63c and 63d, wherein the arm portions 63c and 63d have shapes such that the width continuously decreases from the end portions to the central portion and a uniform-width portion is provided in the central portion as described in the fifth embodiment. The suspension 63 has a frame-shaped holding portion 63e fixed to the distal side of a magnetic circuit unit 67 to the diaphragm 1, wherein the magnetic unit 67 includes the yoke 62, the magnet 4 and the plate 5, the two arm portions 63c and 63d, and two substantially square fixing potions 63a and 63b fixed to the receiving portions 61c and 61a of the holding member 61 and situated symmetrically with respect to the center of the suspension 63. The suspension 64 is made of a resilient matter such as stainless steel or a copper alloy and is a thin flat plate having arm portions 64c and 64d like the suspension 63. The arm portions 64c and 64d have shapes such that the width continuously decreases from the end portions to the central portion and a uniform-width portion is provided in the central portion as described in the fifth embodiment.

The suspension 64 has a frame-shaped holding portion 64e fixed to the diaphragm 1 side of the magnetic circuit unit 67, the two arm portions 64c and 64d, and two substantially square fixing portions 64a and 64b fixed to the receiving portions 61d and 61b of the holding member 61 and situated symmetrically with respect to the center of the suspension 64. The suspension 64 is fixed to the holding member 61 in a direction rotated by 90 degrees with respect to the suspension 63. As shown in the figure, the suspensions 63 and 64 are disposed so as to be fitted on the plane of the magnetic circuit unit 67. The portions of the yoke 62 which are opposite to the arm portions of the suspensions 63 and 64 are trimmed in order to prevent the yoke 62 from coming into contact with the suspensions 63 and 64 at vibration.

Description in detail on operation of the electro-mechanical and acoustic transducer thus constructed will not be omitted because it is substantially the same as that of the electro-mechanical and acoustic transducer of the first embodiment.

Like in the first embodiment, the electro-mechanical and acoustic transducer of the sixth embodiment can generate both vibration and sound by the same unit.

Like in the third embodiment, the yoke 62 of the magnetic circuit unit 67 has the yoke portion substantially forming the magnetic path of the magnetic circuit unit and the weight portion not forming the magnetic path. Therefore, the mess of the moving unit is larger than that of conventional electro-mechanical and acoustic transducers, so that this electro-mechanical and acoustic transducer can generate larger vibration than the conventional electro-mechanical and acoustic transducers of the same size.

The suspensions 63 and 64 have the arm portions of the shape as described in the fifth embodiment. Therefore, the suspensions 63 and 64 have excellent linearity of displacement characteristics and the stress locally generated on the arm portions is cubed. As a result, an electro-mechanical and acoustic transducer which a breakage of the suspensions is not caused immediately by material fatigue and which can generate large vibration is realized. In addition, since the arm portions of the suspensions 63 and 64 are disposed to be orthogonal to each other, a tilt of vibration caused when the magnetic circuit unit 67 vibrates is curbed.

Moreover, by setting a distance t3 between the peripheral surface of the yoke 62 and the holding member 61 so as to be smaller than both a distance t1 between the voice coil 8 inserted in the magnetic gap and the inner surface of the yoke 62 and a distance t2 between the voice coil 8 and the outer surface of the plate 5, the voice coil 8 is prevented from coming into contact with the yoke 62 and the plate 5 at vibration. By providing the yoke 62 with the cut portion 62c, the voice coil 8 i prevented from coming into contact with the bottom surface of the yoke 62 at vibration. Consequently, the voice coil 8 and the diaphragm 1 are prevented from being broken at vibration. By setting a distance t4 between the suspension 63 and the baffle 66 so as to be smaller than the limit of resilience of the arm portions of the suspensions, the deform of the suspensions 63 and 64 due to accidental drop shock is restrained within a permissible range. As a result, an electro-mechanical and acoustic transducer which has high reliability to drop shock is realized.

Seventh Embodiment

Figure 17:
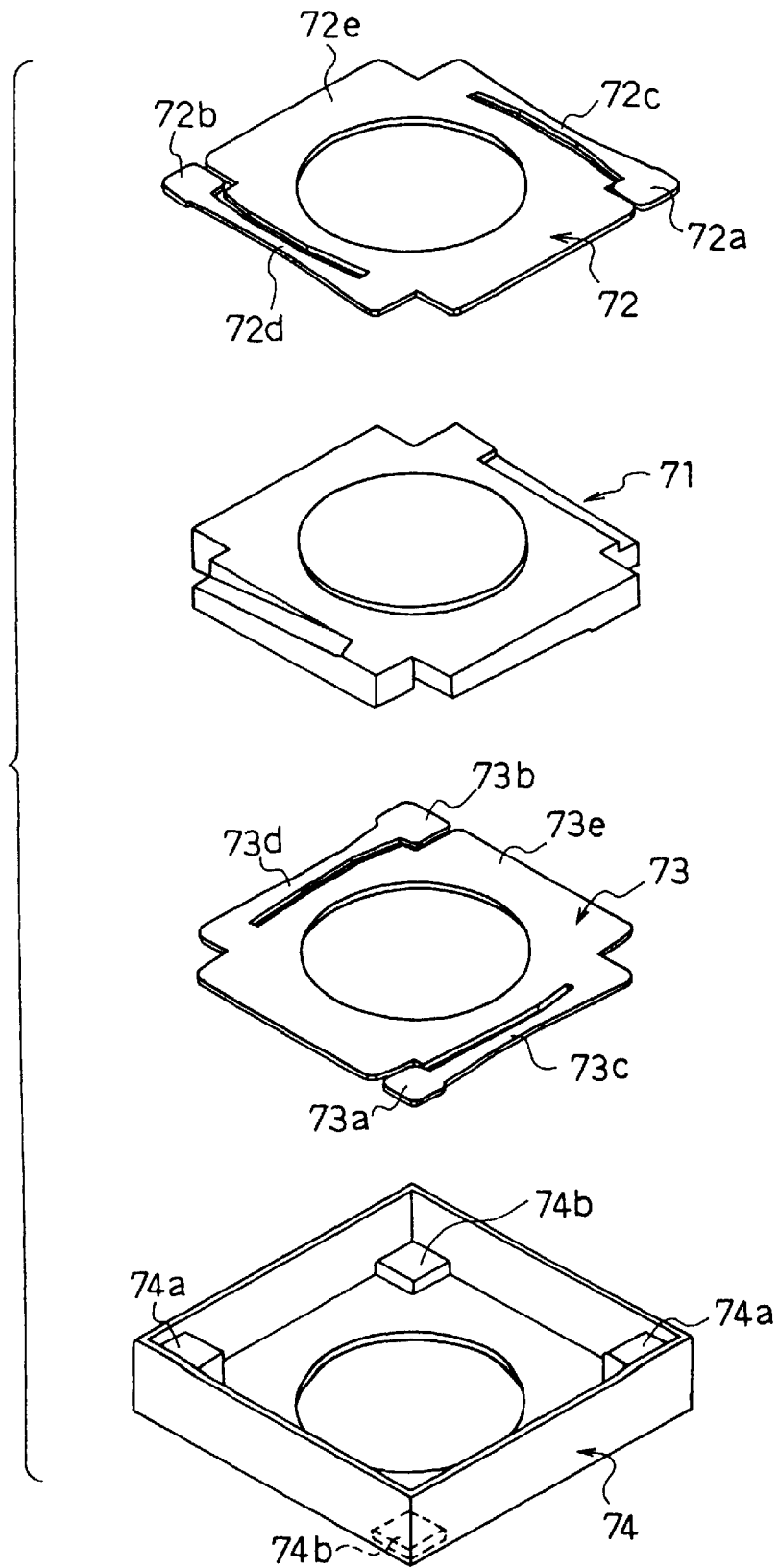
FIG. 17 is an exploded perspective view of a principal portion of an electro-mechanical and acoustic transducer according to a seventh embodiment.
Figure 18:
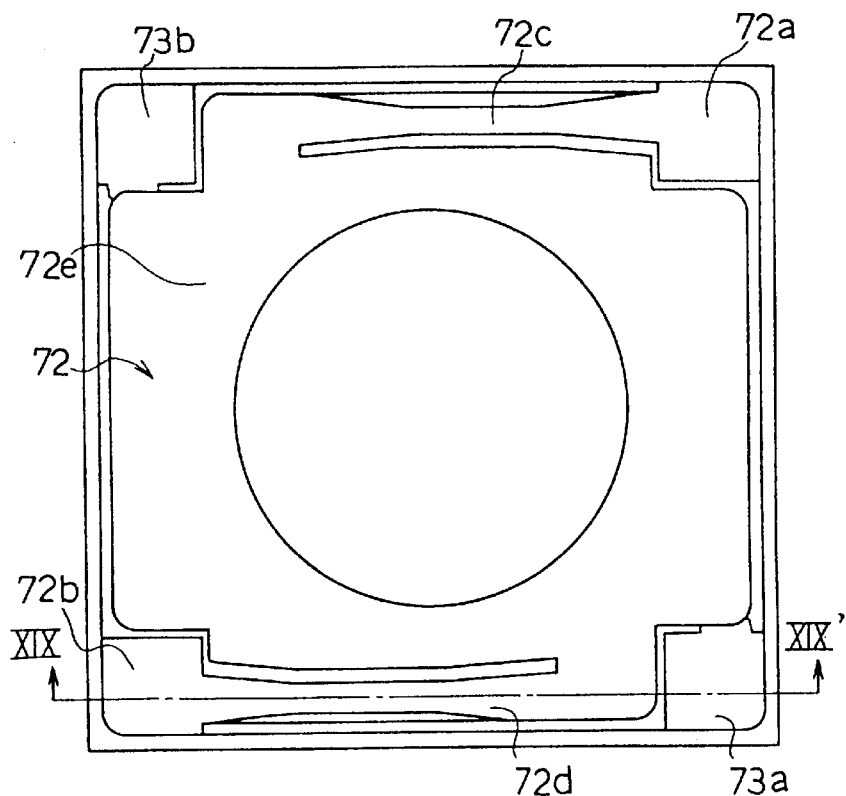
FIG. 18 is a plane view of the electro-mechanical and acoustic transducer of FIG. 18.
Figure 19:
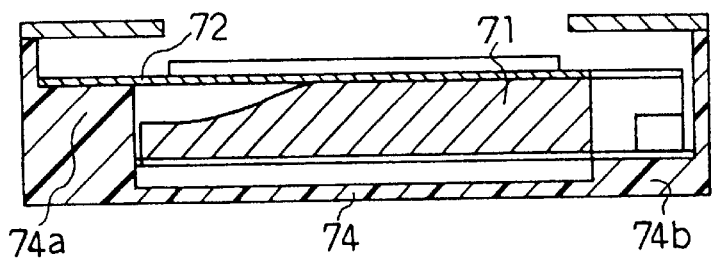
FIG. 19 is a cross-sectional view taken on the line XIX–XIX' of the electro-mechanical and acoustic transducer of FIG. 18.
Figure 20:
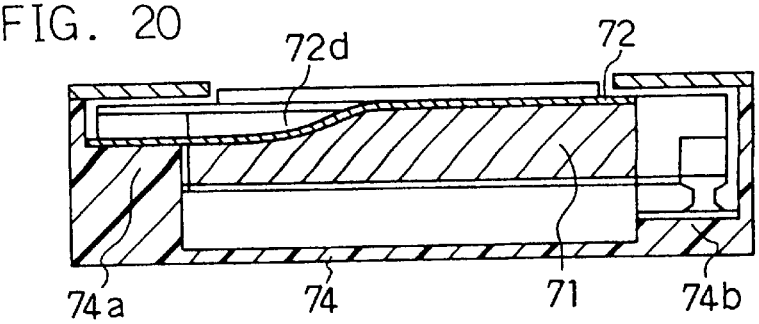
FIG. 20 is a cross-sectional view taken on the line XIX–XIX' of the electro-mechanical and acoustic transducer of FIG. 18 at the time of an excessive input when the suspension and the magnetic circuit unit come into contact with each other.

An electro-mechanical and acoustic transducer according to a seventh embodiment will be described with reference to FIGS. 17, 18, 19 and 20. FIG. 17 is an exploded perspective view of a principal portion of the electro-mechanical and acoustic transducer. FIG. 18 is a plane view of the electro-mechanical and acoustic transducer. FIG. 19 is a cross-sectional view taken on the line XIX–XIX' of the electro-mechanical and acoustic transducer of FIG. 18. FIG. 20 is a cross-sectional view taken on the line XIX–XIX' of the electro-mechanical and acoustic transducer of FIG. 18 at the time of an excessive input when the suspension and the magnetic circuit unit come into contact with each other.

A magnetic circuit unit 71 has a rectangular periphery and generates force by a voice coil or a exciting coil described in the above-mentioned embodiments.

A suspension 72 is made of a resilient matter such as stainless steel or a copper alloy and is a thin flat plate shape having arm portion 72c and 72d. The arm portions 72c and 72d have shapes such that the width continuously decreases from the end portions to the central portion and a uniform-width portion is provided in the central portion as described in the fifth embodiment. The suspension 72 has a frame-shaped holding portion 72e fixed to the magnetic circuit unit 71, the two arm portions 72c and 72d, and two substantially square fixing portions 72a and 72b fixed to receiving portions 74a of a subsequently-described holding member 74 and situated symmetrically with respect to the center of the suspension 72. The suspension 73 is made of a resilient matter such as stainless steel or a copper alloy and is a thin flat plate shape having arm portions 73c and 73d like the suspension 72. The arm portions 73c and 73d have shapes such that the width continuously decreases from the end portions to the central portion and a uniform-width portion is provided in the central portion as described in the fifth embodiment. The suspension 73 has a frame-shaped holding portion 73e fixed to the magnetic circuit unit 71, the two arm portions 73c and 73d, and two substantially square fixing portions 73a and 73b fixed to receiving portions 74b of the holding member 74 and situated symmetrically with respect to the center of the suspension 73. The suspension 73 is fixed to the holding member 74 in a direction rotated by 90 degrees with respect to the suspension 72. The portions of the magnetic circuit unit 71 which is opposite to the arm portions of the suspensions 72 and 73 are trimmed in s-shape in order to prevent the magnetic circuit unit 71 from coming into contact with the suspensions 72 and 73 at vibration.

The holding member 74 is made of a material such as plastics and has square peripheral and inner surfaces and has at each angle the rectangular receiving portions 74a and the rectangular receiving portions 74b lower than the receiving portions 74a. Receiving portions in a diagonal, positional relationship have the same height and the difference in height between adjoining receiving portions is substantially the same as the thickness of the magnetic circuit unit 71.

Since the magnetic circuit unit 71 has a rectangular shape, the mass of the magnetic circuit unit 71 is larger than that of a circular magnetic circuit unit. Consequently, the electro-mechanical and acoustic transducer of the seventh embodiment can generate larger vibration than the conventional electro-mechanical and acoustic transducers having a circular magnetic circuit unit.

Since the magnetic circuit unit 71, the suspensions 72 and 73 and the holding member 74 are simple in construction, an electro-mechanical and acoustic transducer which is easily assembled and has excellent workability is realized.

In the magnetic circuit unit 71, the positions which are opposite to the arm portions of each suspension are trimmed in S-shape according to the maximum permissible amount where the suspensions can resist deformation due to vibration. Therefore, when the electric signal which is input to a voice coil or a exciting coil is large, the magnetic circuit unit 71 and the suspension 72 and 73 come to contact with each other, so that the vibration of the magnetic circuit unit 71 is restrained. Consequently, durability of the electro-mechanical and acoustic transducer improves.

Eighth Embodiment

The above-mentioned electro-mechanical and acoustic transducers generate larger vibration than the conventional electro-mechanical and acoustic transducers. However, a resonance frequency of a mechanical vibration system, wherein the condition to enable obtaining of the largest vibration from the electro-mechanical and acoustic transducers may vary by nonuniformity among electro-mechanical and acoustic transducers at the time of manufacture and conditions of attachment to portable terminal units, so that there are occasions when vibration cannot be efficiently obtained from the electro-mechanical and acoustic transducers.

Figure 21:
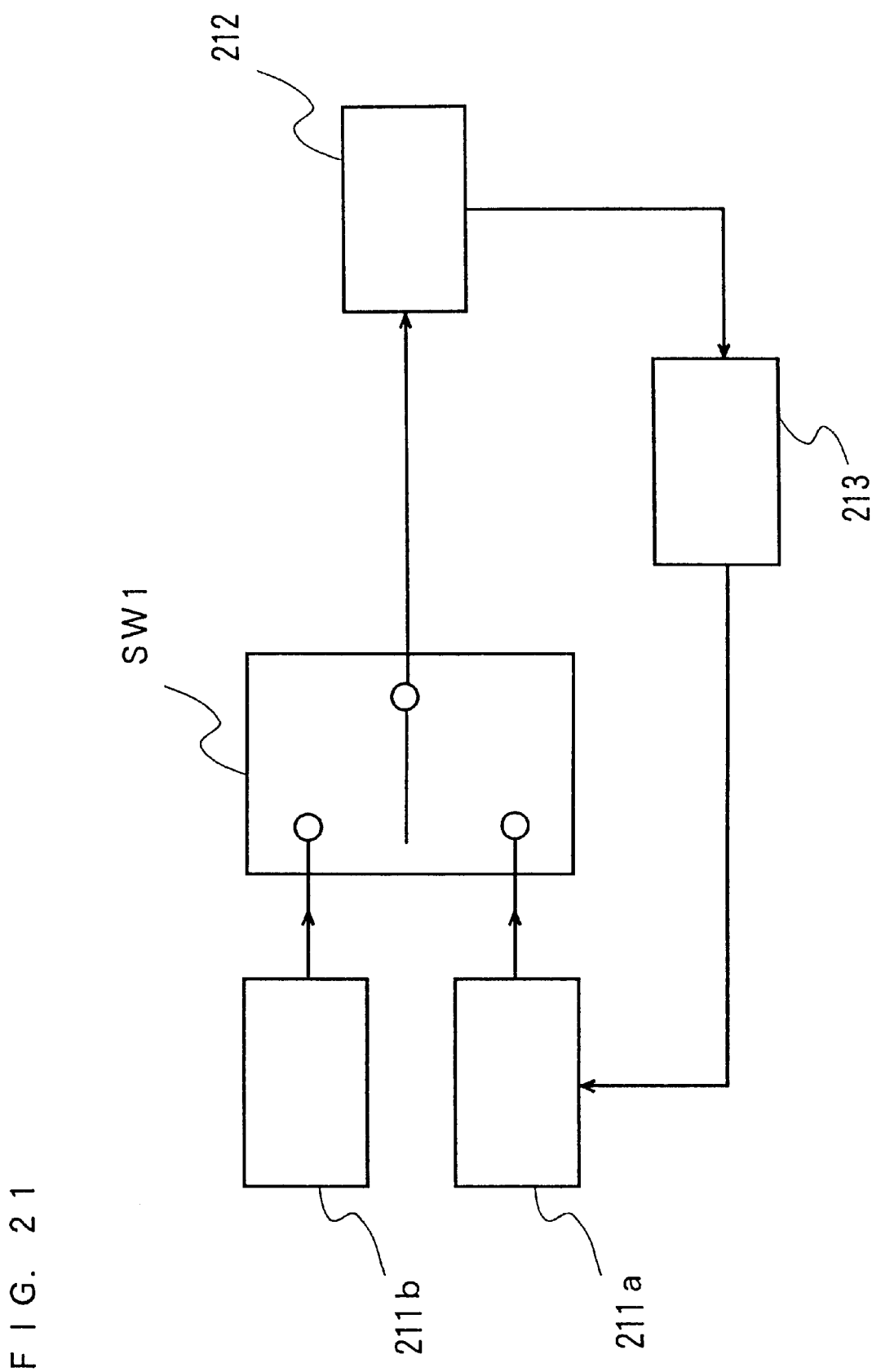
FIG. 21 is a block diagram in which an electric signal is input to an electro-mechanical and acoustic transducer according to an eighth embodiment.

The eighth embodiment relates to an electro-mechanical and acoustic transducer in which large vibration is obtainable from the electro-mechanical and acoustic transducer even in such a case. The eighth embodiment will be described with reference to FIG. 21. FIG. 21 is a block diagram in which an electric signal is input to the electro-mechanical and acoustic transducer.

The block diagram of FIG. 21 includes an electro-mechanical and acoustic transducer 212 built in a portable terminal unit, a detector 213 for detecting the resonance frequency of a mechanical vibration system of the electro-mechanical and acoustic transducer 212, a first electric signal generator 211a for outputting an electric signal of the frequency detected by the detector 213 to the electric-mechanical and acoustic transducer 212, a second electric signal generator 211b for outputting an electric signal of voice band to the electro-mechanical and acoustic transducer 212, and a switch SW1 for selecting any of output of the first and second electric signal generator 211a and 211b.

The detector 213 detects the resonance frequency of the mechanical vibration system of the electro-mechanical and acoustic transducer 212. The detector 213 outputs the value of the detected resonance frequency to the first electric signal generator 211a. The first electric signal generator 211a is connected to the electro-mechanical and acoustic transducer 212 via the switch SW1. The first signal generator 211a outputs to the electro-mechanical and acoustic transducer 212 an electric signal of the frequency which is input from the detector 213.

Thus, an electric signal having frequency substantially coinciding with the resonance frequency of the electro-mechanical and acoustic transducer 212 is input to the electro-mechanical and acoustic transducer 212. Therefore, even when the resonance frequency of the mechanical vibration system of the electro-mechanical and acoustic transducer 212 varies by nonuniformity among the electro-mechanical and acoustic transducers at the time of manufacture and conditions of attachment to portable terminal units, the electro-mechanical and acoustic transducer 212 can generate large vibration.

In the case that the electro-mechanical and acoustic transducer 212 is connected to the second signal electric generator 211b by the switch SW1, the electric signal is input from the second electric signal generator 211b to the electro-mechanical and acoustic transducer 212, so that the electro-mechanical and acoustic transducer 212 generates sound.

By constructing so, the electro-mechanical and acoustic transducer unit, which is capable of indicating an incoming call by vibration, indicating an incoming call by sound and reproducing sound and acoustical signal, is realized.

Ninth Embodiment

Figure 22:
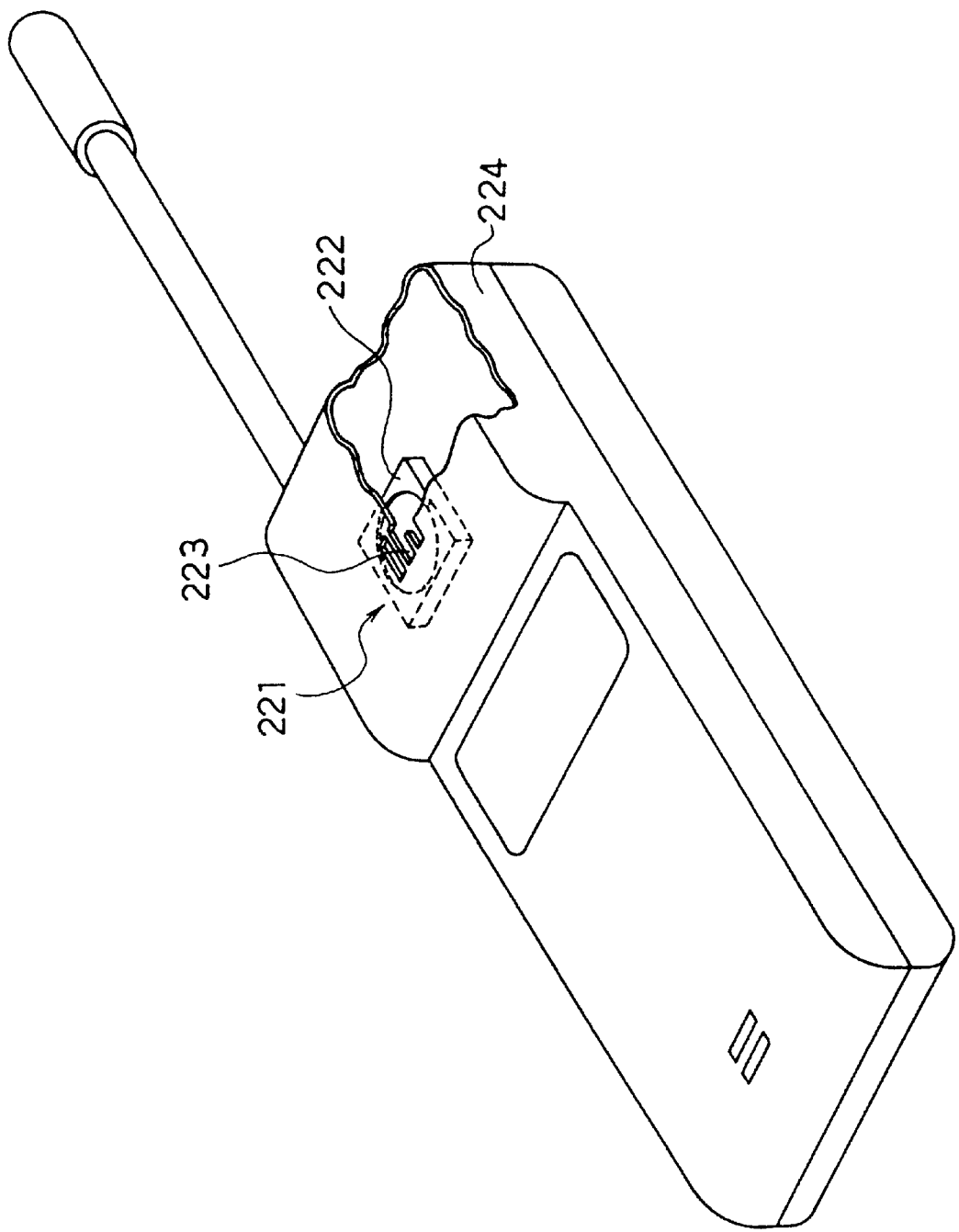
FIG. 22 is a perspective view of a portable telephone apparatus in which an electro-mechanical and acoustic transducer according to a ninth embodiment is mounted.

The ninth embodiment relates to a portable terminal unit with a built-in electro-mechanical and acoustic transducer described in the above-mentioned embodiment and will be described with reference to FIG. 22 with a portable telephone unit as an example. FIG. 22 is a partly broken perspective view of the portable telephone unit with built-in electro-mechanical and acoustic transducer.

The portable telephone unit with built-in electro-mechanical and acoustic transducer is constructed as follows.

A body 221 of the portable telephone unit has an outside case 224 having a sound hole 223. The electro-mechanical and acoustic transducer 222 described in the above-mentioned embodiment is attached to the outside case 224 by a holding member so that the diaphragm is opposed to the sound hole 223 of the outside case 224. The electro-mechanical and acoustic transducer may be attached to a circuit board of the portable terminal unit instead of the outside case 224.

With respect to the portable telephone unit thus constructed, its operation will be described.

When the portable telephone unit receives a cell signal, an electric signal including a frequency component close to the resonance frequency of a mechanical vibration system of the electro-mechanical and acoustic transducer 222 is input to the electro-mechanical and acoustic transducer 222 by the electric signal generator provided in the portable telephone unit. Since the frequency of the electric signal input to the electro-mechanical and acoustic transducer 222 substantially coincides with the resonance frequency of the mechanical vibration system of the electro-mechanical and acoustic transducer 222, the electro-mechanical and acoustic transducer 222 largely vibrates. This vibration is transmitted from the electro-mechanical and acoustic transducer 222 to the outside case 224 of the portable telephone unit, so that the outside case 224 of the portable telephone unit largely vibrates. Consequently, the user carrying the portable telephone unit can be informed of an incoming call by the vibration of the outside case 224 of the portable telephone unit.

When the portable telephone unit receives a call signal, an electric signal of an audible frequency, particularly a frequency highly sensitive to the human ear, is input to the electro-mechanical and acoustic transducer 222 by the electric signal generator provided in the portable telephone unit. The diaphragm provided in the electro-mechanical and acoustic transducer 222 vibrates to generate sound. Therefore, the user can inform of and incoming call by sound.

When the portable telephone unit receives a voice signal, an electric signal of voice frequency band is input to the electro-mechanical and acoustic transducer 222 by the electric signal generator provided in the portable telephone unit. The diaphragm provided in the electro-mechanical and acoustic transducer 222 vibrates to reproduce the received voice. Therefore, the user can listen to the received voice.

Thus, by the portable telephone unit with built-in electro-mechanical and acoustic transducer described in the above-mentioned embodiment, a portable telephone unit, wherein a single common transducer has the function of informing the user of an incoming call by vibration, the function of informing the user of an incoming call by sound and the function of reproducing the received voice, is realized.

When a portable telephone unit includes a first electric signal generator for outputting an electric signal to inform the user of an incoming call by vibration, a second electric signal generator for outputting an electric signal to inform the user of an incoming call by sound or outputting a voice signal, and a switching device for selecting any one of the output of the first electric signal generator and the output of the second electric signal generator, the portable telephone unit can switch among an incoming call by vibration, an incoming call by sound and reproduction of the received voice.

Vibration give different effect to body depending on their frequency band. A frequency of vibration which is highly sensitive to human body is 200 Hz or lower. Since vibration in a frequency band in the vicinity of 130 Hz is especially highly sensitive for body, it is desired to use such frequency band as the frequency of the electric signal for use to inform the user of an incoming call by vibration. Since sound of a higher frequency band is highly sensitive to the human ear, it is desired to use a frequency band of 1 kHz or higher as the frequency of the electric signal for use to inform the user of an incoming call by sound. From the viewpoint of the articulation of sound, it is desired that the frequency band of the electric signal for use to reproduce the received voice be substantially 200 Hz or lower.

Tenth Embodiment

A portable terminal unit according to a tenth embodiment will be described with reference to FIG. 23 which is a block diagram where an electric signal is input to an electro-mechanical and acoustic transducer.

Figure 23:
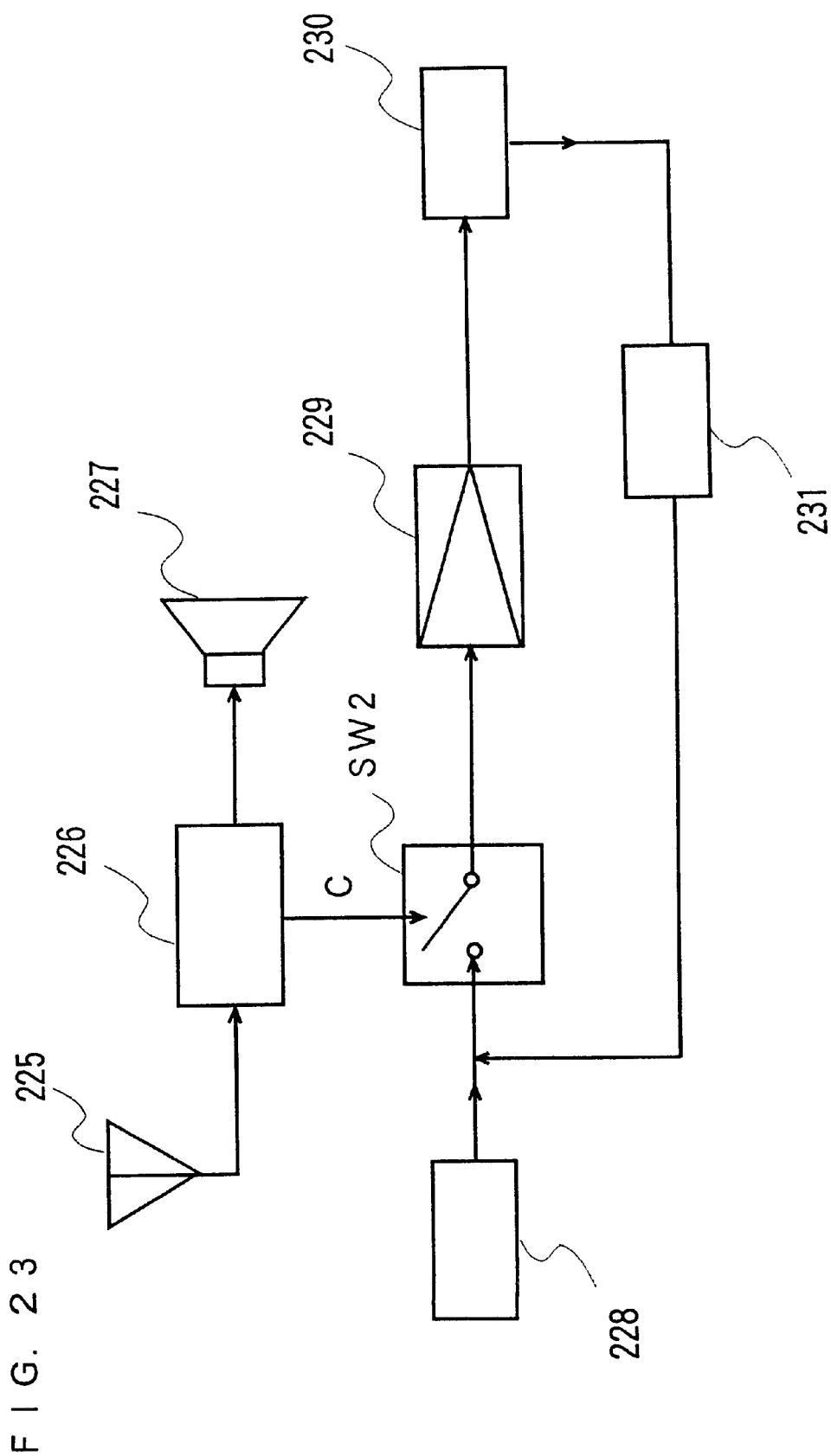
FIG. 23 is a block diagram in which an electric signal is input to an electro-mechanical and acoustic transducer according to a tenth embodiment.

A circuit shown in the block diagram of FIG. 23 comprises an antenna 225 for receiving incoming signals including a receiving signal for informing an incoming call and a voice signal produced by the voice of the transmitting person, a receiving signal processing circuit 226 for processing these incoming signals received by the antenna 225, a receiver 227 including a small-size speaker for reproducing the received voice signal processed by the receiving signal processing circuit 226, an electric signal generator 228 for outputting an electric signal including a signal component of at least one resonation frequency of the electro-mechanical and acoustic transducer 230, an amplifier 229 for amplifying an electric signal, a switch SW2 whose ON/OFF is controlled by a signal from the receiving signal processing circuit 226, an electro-mechanical and acoustic transducer 230 described in the above-mentioned embodiments whereto an electric signal is input from the amplifier 229, and a detector 231 for detecting an impedance of the electro-mechanical and acoustic transducer which abruptly changes at the resonance frequency of the electro-mechanical and acoustic transducer and outputting a signal at the resonance frequency to the amplifier 229. Here, the signal level of the electric signal output from the electric signal generator 228 is selected such that when the electric signal output is inputted to the electro-mechanical and acoustic transducer 230 the vibration and the sound are not sensed by the user.

An operation of the portable terminal unit thus constructed will be described.

The antenna 225 receives the incoming signal transmitted from a transmitting side portable terminal unit and the received incoming signal is output to the receiving signal processing circuit 226. The receiving signal processing circuit 226 processes the incoming signal, generates and sends to the switch SW2 a signal C responding to the receiving signal to inform of an incoming call and outputs the signal C to the switch SW2. By being controlled by the signal C, the switch SW2 connects the electric signal generator 228 to the amplifier 229. An electric signal which is output by the electric signal generator 228 is input to the amplifier 229. The amplifier 229 amplifies the input electric signal and outputs is to the electro-mechanical and acoustic transducer 230. The detector 231 detects an impedance which abruptly changes at the resonance frequency of the electro-mechanical and acoustic transducer and outputs a signal of the resonance frequency to the amplifier 229. The signal is further amplified by the amplifier 229. By repeating this, the electro-mechanical and acoustic transducer self-oscillates at a frequency of either vibration or sound, or at frequencies of both vibration and sound.

When the user of the portable terminal unit notices an incoming call and operates the unit to the receiving state, the receiving signal processing circuit 226 stops to generate the signal C in accordance with the known control means. Then, the receiving signal processing circuit 226 processes the received voice signal and outputs the processed signal to the receiver 227. The receiver 227 reproduces the received voice.

As mentioned above, even when the resonance frequency of the electro-mechanical and acoustic transducer 230 changes owing to a change in environment where the electro-mechanical and acoustic transducer 230 is placed, the oscillation in the electric signal generator 228 are continuously made the electric signal. Therefore, a resonance frequency is detected afresh, so that the electro-mechanical and acoustic transducer makes self-oscillation either at a frequency of vibration or of sound, or at both frequencies. Consequently, a portable terminal unit which can stably generate both vibration and sound is realized.

Figure 24:
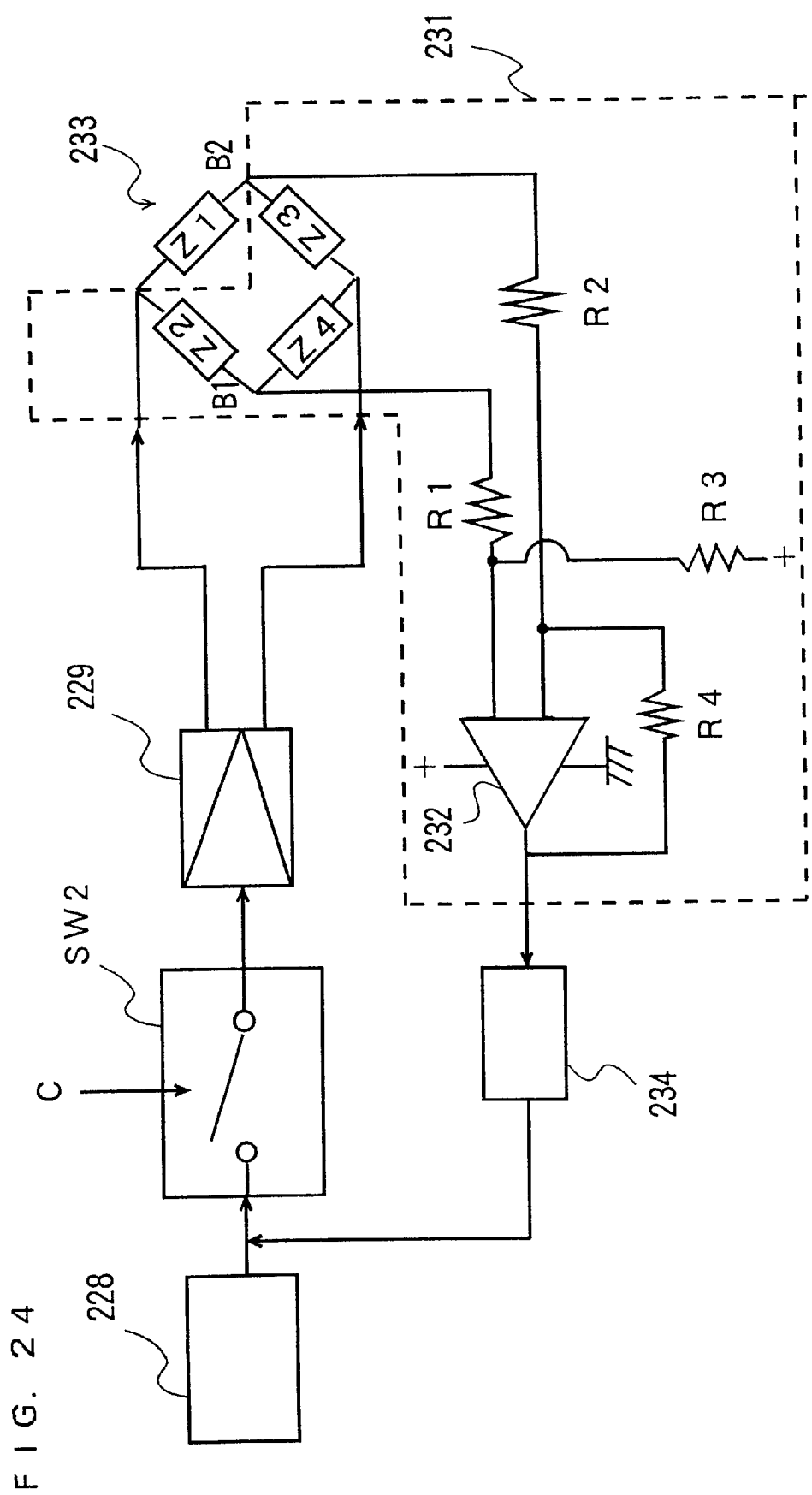
FIG. 24 is a view of assistance in explaining a detector of FIG. 23.

Next, details of the detector 231 of FIG. 23 will be described with reference to FIG. 24 which is a block diagram for explaining the detector 231 in detail.

A bridge circuit 233 comprises bridge load impedance elements Z2, Z3 and Z4 and an impedance element Z4 equivalently representing the impedance of the voice coil of the electro-mechanical and acoustic transducer The impedances of the impedance elements Z1, Z2, Z3 and Z4 are selected so that the outputs from output terminals B1 and B2 of the bridge circuit 223 are minute for an electric signal having a frequency component away from the resonance frequency of the electro-mechanical and acoustic transducer. The output of the bridge circuit 233 is input to an operational amplifier 232 and the output of the operational amplifier 232 is input to a limiter 234. The output of the limiter 234 is input to the amplifier 229.

When an electric signal having the resonance frequency of the electro-mechanical and acoustic transducer is input from the amplifier 229 to the electro-mechanical and acoustic transducer 230, the impedance value of the impedance element Z1 abruptly changes, and therefore, the equilibrium of the bridge circuit 233 is broken, so that the output from the operational amplifier 232 increases. The output from the operational amplifier 232 is input to the limiter 234 and is input from the limiter 234 to the amplifier 229 through the switch SW2. By thus repeating the positive feedback, the electro-mechanical and acoustic transducer makes a self-oscillation either at a frequency of vibration or sound, or at both frequencies.

By disposing the limiter 234 on the output side of the detector 231, the output level of the detector 231 is limited, so that excessive level input to the amplifier 229 and to the electro-mechanical and acoustic transducer 230 is limited.

Eleventh Embodiment

A portable terminal unit according to an eleventh embodiment will be described with reference to FIG. 25 which is a block diagram where an electric signal is input to the electro-mechanical and acoustic transducer.

With respect to the circuit configuration of the portable terminal unit, only the difference from the circuit configuration of the portable terminal unit of the tenth embodiment will be described. Corresponding elements and portions with those of the tenth embodiment are denoted by the same reference numerals and no overlapping description will be given because the description of the tenth embodiment may be applied.

The portable terminal unit of the eleventh embodiment has the electric signal generator 228 and oscillates by use of noises such as thermal noises in the circuits of the amplifier 229 and the detector 231. Noises such as thermal noises include wide-band frequency components and are generally of low level power compared with signal components.

Like in the tenth embodiment, the signal C is input from the receiving signal processing circuit 226 to the switch SW2, and the switch SW2 is turned on by being controlled by the signal C. Noises such as thermal noises are amplified by the amplifier 229 and input to the electro-mechanical and acoustic transducer 230. After the amplified noises are input to the electro-mechanical and acoustic transducer 230, like in the tenth embodiment, the noises input to the electro-mechanical and acoustic transducer are further amplified through positive feedback, so that the electro-mechanical and acoustic transducer makes a self-oscillation either at a frequency of vibration or sound, or at both frequencies.

Figure 25:
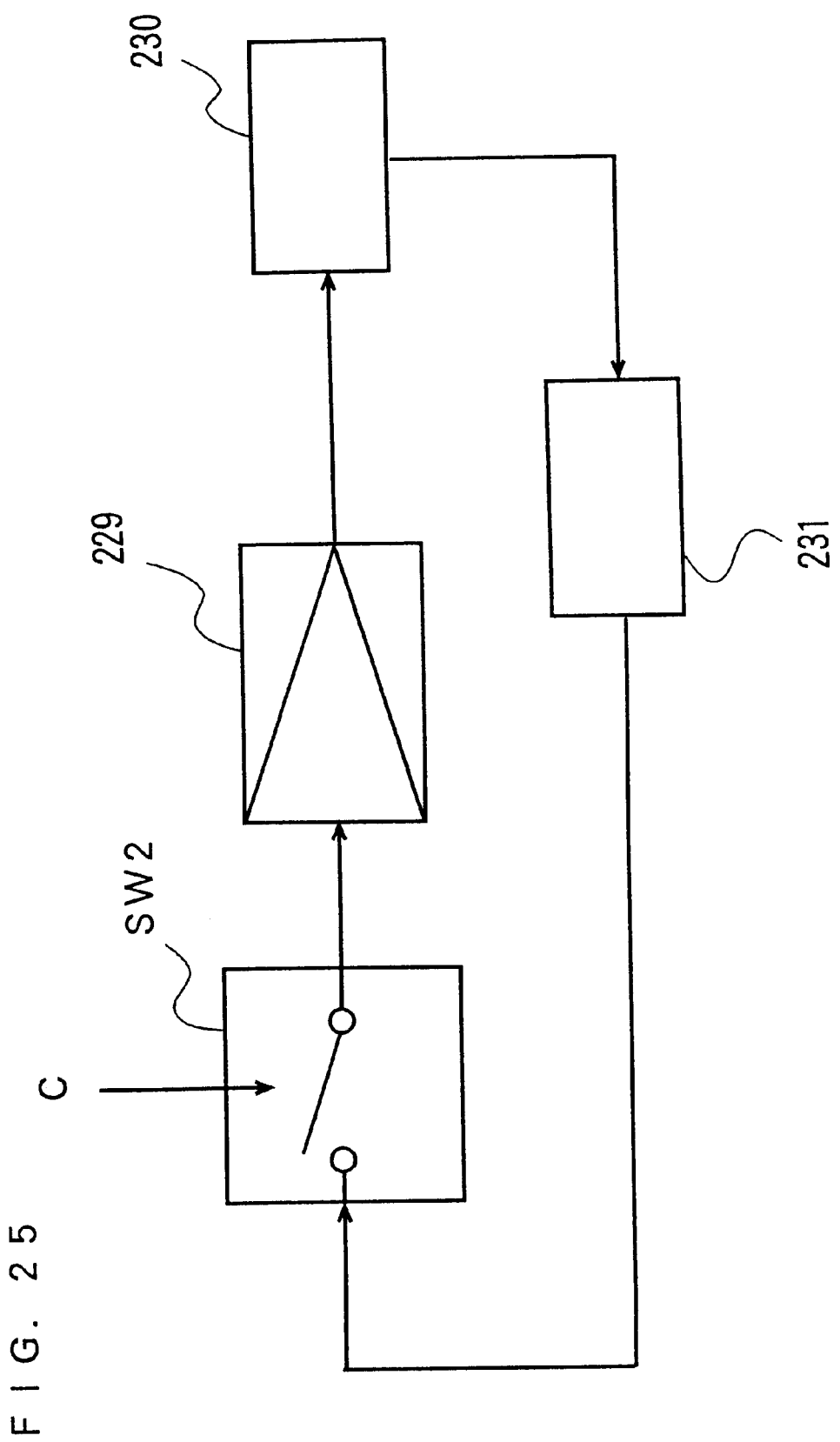
FIG. 25 is a block diagram in which an electric signal is input to an electro-mechanical and acoustic transducer according to an eleventh embodiment.

When the electro-mechanical and acoustic transducer is constructed as shown in FIG. 25, in addition to the technical advantages of the tenth embodiment, such an advantage is obtained that the electric signal generator may be omitted. Therefore, the cost reduction of the portable terminal unit is achieved and the size reduction of the portable terminal unit is achieved.

Twelfth Embodiment

Figure 26:
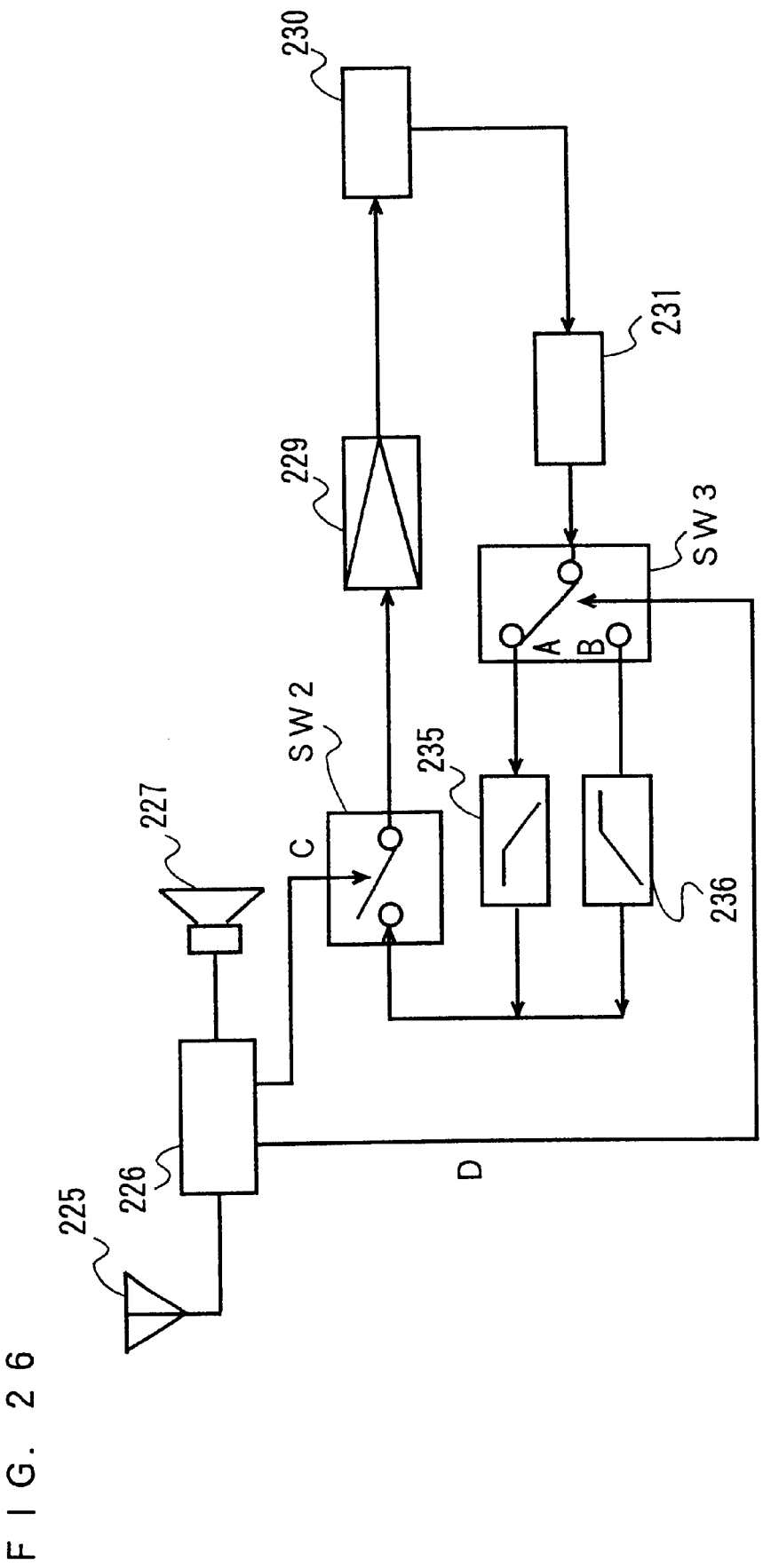
FIG. 26 is a block diagram in which an electric signal is input to an electro-mechanical and acoustic transducer according to a twelfth embodiment.

A portable terminal unit according to a twelfth embodiment will be described with reference to FIG. 26 which is a block diagram where an electric signal is input to the electro-mechanical and acoustic transducer.

With respect to the circuit configuration of the portable terminal unit, only the difference from the circuit configurations of the portable terminal unit of the tenth and eleventh embodiments will be described. Corresponding elements and portions with those of the tenth and eleventh embodiments are denoted by the same reference numerals and no overlapping description will be given because the description of the tenth and eleventh embodiments may be applied.

In the portable terminal unit of the twelfth embodiment, a low-pass filter 235 and a high-pass filter 236 are provided between the amplifier 226 and the detector 231, and a switch SW2 for switching output of the detector 231 is provided. The electro-mechanical and acoustic transducer 230 has at least two resonance frequencies as follows: a first resonance frequency which is low and for generating vibration and, a second resonance frequency which is high and for generating sound of an audible frequency.

The user selects either the incoming call by vibration or the incoming call by sound by use of a switch attached to the portable terminal unit. In response thereto, the receiving signal processing circuit 226 generates a signal D and outputs the signal D to the switch SW3.

When the user selects the indication of an incoming call by vibration, the switch SW3 is switched to side A by the signal D which is input from the receiving signal processing unit 226. The output of the detector 231 is input to the low-pass filter 235. The low-pass filter 235 does not pass signals of the second resonance frequency and passes only signals of the first resonance frequency which is lower to the amplifier 229. Thus, the portable terminal unit generates vibration for informing an incoming call.

When the user selects the incoming call by sound, the switch SW2 is switched to side B by the signal D which is input from the receiving signal processing unit 226. The output of the detector 231 is input to the high-pass filter 236. The high-pass filter 236 does not pass signals of the first resonance frequency and passes only signals of the second resonance frequency to the amplifier 229. Thus, the portable terminal unit generates sound for informing an incoming call.

When the user selects both of incoming call by vibration and sound, the switch SW3 is switched alternatively to side A and to side B in response to the signal D which is input from the receiving signal processing circuit 226. The output of the detector 231 is input alternatingly to the low-pass filter 235 and to the high-pass filter 236. In this case, the portable terminal unit alternatingly generates sound and vibration for informing an incoming call.

When the signals having the first and second resonance frequencies are output to the amplifier 229 by using only one of the low-pass filter 235 and the high-pass filter 236, the portable terminal unit may simultaneously generate sound and vibration for informing an incoming call.

When an electro-mechanical and acoustic transducer has three or more resonance frequencies, a band-pass filter that passes two resonance frequencies which are a low frequency suitable for vibration and an audible frequency suitable for sound may be used instead of the low-pass filter 235 and the high-pass filter 235.

By the above-mentioned configuration, self-oscillation at non-target frequencies is presented, so that a portable terminal unit wherewith an easy selection between the incoming call by vibration and the incoming call be sound is realized.

Thirteenth Embodiment

Figure 27:
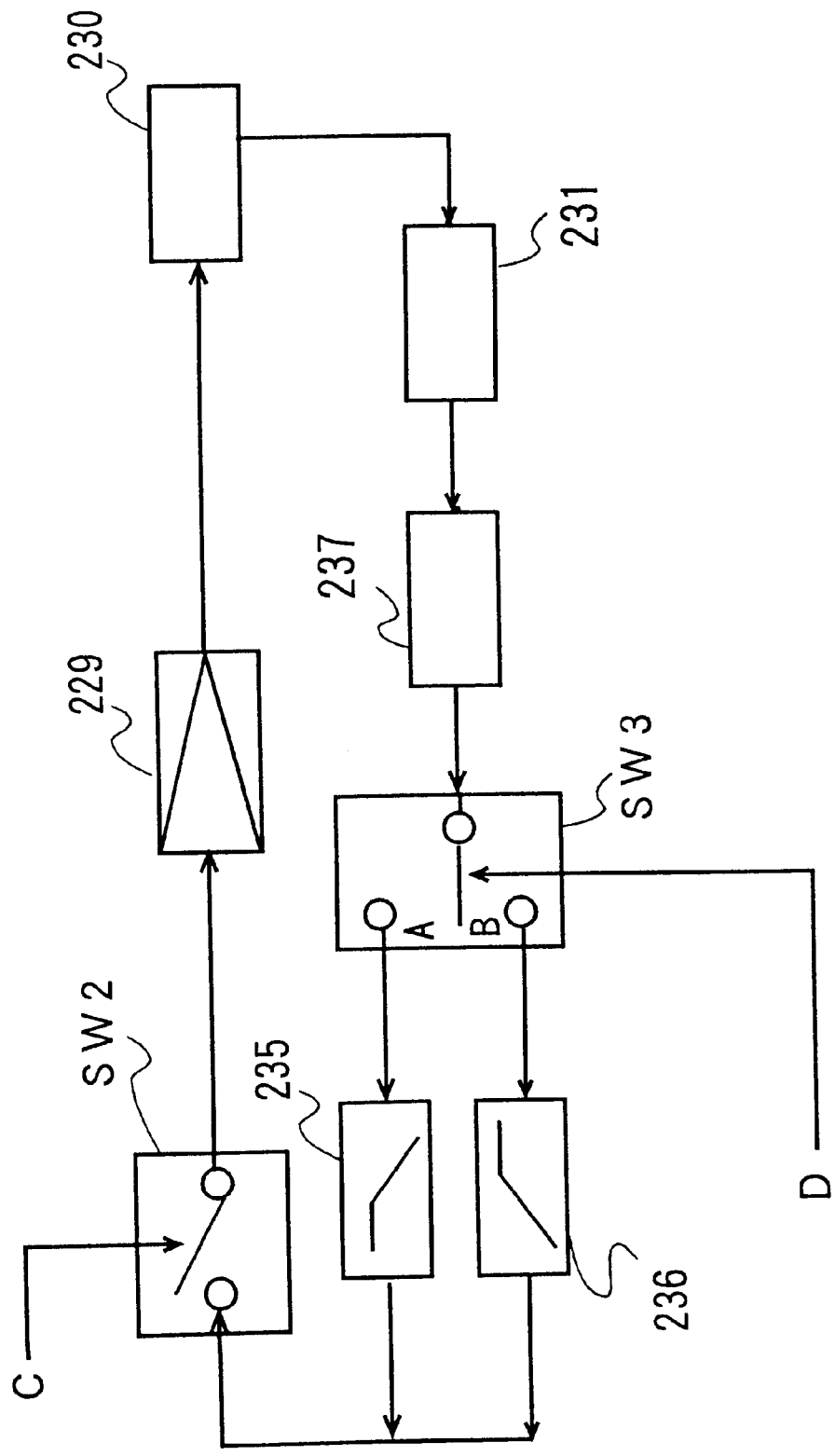
FIG. 27 is a block diagram in which an electric signal is input to an electro-mechanical and acoustic transducer according to a thirteenth embodiment.

A portable terminal unit an in accordance with a thirteenth embodiment will be described with reference to FIG. 27 which is a block diagram where an electric signal is input to the electro-mechanical and acoustic transducer.

With respect to the circuit configuration of the portable terminal unit, only the difference from the circuit configuration of the portable terminal unit of the twelfth embodiment will be described. Corresponding elements and portions with those of the tenth, eleventh and twelfth embodiments are denoted by the same reference numerals and no overlapping description will be given because the description of the tenth, eleventh and twelfth embodiments may be applied.

In the portable terminal unit of the thirteenth embodiment, a limiter 237 is disposed between the output terminal of the detector 231 and the switch SW3.

By thus providing the limiter 237 at the output terminal of the detector 231, the outer level of the detector 231 is limited to a predetermined level or below, so that damage of the portable terminal unit due to excessive input to the amplifier 229 and to the electro-mechanical and acoustic transducer 230 is presented.

Fourteenth Embodiment

Figure 28:
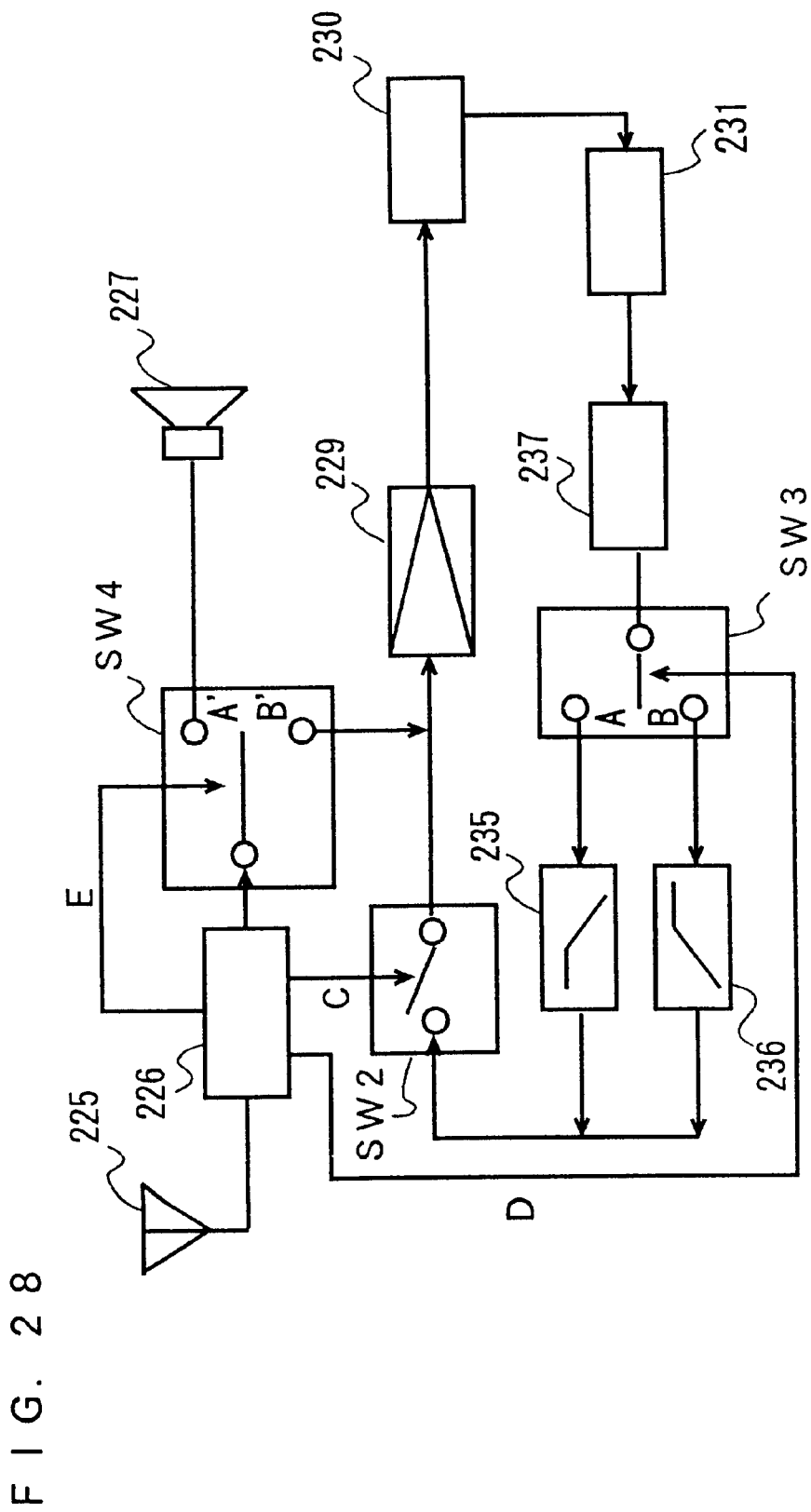
FIG. 28 is a block diagram in which an electric signal is input to an electro-mechanical and acoustic transducer according to a fourteenth embodiment.

A portable terminal unit according to a fourteenth embodiment will be described with reference to FIG. 28 which is a block diagram where an electric signal is input to the electro-mechanical and acoustic transducer.

With respect to the circuit configuration of the portable terminal unit, only the difference from the circuit configuration of the portable terminal unit of the thirteenth embodiment will be described. Corresponding elements and portions with those of the tenth, eleventh, twelfth and thirteenth embodiments are denoted by the same reference numerals and no overlapping description will be given because the description of the tenth, eleventh, twelfth and thirteenth embodiments may be applied.

In the portable terminal unit of the fourteenth embodiment, a switch SW4 is provided between the receiving signal processing circuit 226 and the receiver 227.

By use of a switch (not shown) provided in the portable terminal unit, the user selects whether the reproduce sound is output from the receiver 227 or from the electro-mechanical transducer 230.

When the user selects that the reproduced sound is output from the receiver 227, the switch SW4 is switched to side A' in response to a signal E which is input from the receiving signal processing circuit 226 to the switch SW4. The receiver 227 converts the voice signal which is input from the receiving signal processing circuit 226 into a sound.

When the user selects that the reproduced sound is output from the electro-mechanical and acoustic transducer 230, the switch SW4 is switched to side B' in response to the signal E which is input from the receiving signal processing circuit 226 to the switch SW4. The amplifier 229 amplifies at a predetermined adjusted amplification factor the voice signal which is input from the receiving signal processing circuit 226 and outputs it to the electro-mechanical and acoustic transducer 230. The electro-mechanical and acoustic transducer 230 converts the signal which is input from the amplifier 229 into sound.

Since the receiver reproduces sound while usually being attached to the human ear, the sound pressure reproduced by the receiver is low (namely sound is small), so that the user cannot listen to the reproduced sound when the portable terminal unit is away from the human ear. By the way, since an excessively large sound pressure leads to damage of ear, to increase the sound pressure is limited by law.

In the portable terminal unit of this embodiment, since the received voice may be reproduced by the electro-mechanical and acoustic transducer, the user can listen to the reproduced sound even when the portable terminal unit is put away from the ear.

Fifteenth Embodiment

A portable terminal unit in accordance with a fifteenth embodiment will be described with reference to FIG. 29 which is a block diagram where an electric signal is input to the electro-mechanical and acoustic transducer.

In the portable terminal apparatus of the fifteenth embodiment, the output of the switch SW4 is directly input to the electro-mechanical and acoustic transducer 230.

The receiving signal processing circuit 226 amplifies the electric signal which is output to the electro-mechanical and acoustic transducer 230 to a sound pressure level at which the user can listen to the reproduced sound even when the portable terminal unit is put away from the ear. Consequently, the electro-mechanical and acoustic transducers unit of the fifteenth embodiment is unnecessary to adjust the amplification factor of the amplifier 229 and is different from that of the fourteenth embodiment.

What is claimed is:

1. An electro-mechanical and acoustic transducer comprising:

a diaphragm;

a magnetic circuit unit forming a magnetic path having a magnetic gap therein and disposed so as to be operably opposed to diaphragm;

a weight which is provided integral with or separated from said magnetic circuit unit and does not form a substantial part of said magnetic path;

said magnetic circuit unit and said weight constituting a moving unit;

at least one suspension for holding said moving unit;

a holding member for operably holding said diaphragm and said suspension; and a driving unit for generating an electromagnetic driving force to interactively operate between said diaphragm and said magnetic circuit unit.

2. An electro-mechanical and acoustic transducer according to claim 1, wherein said driving unit is a voice coil which is fixed to said diaphragm and operably inserted in a magnetic gap formed i said magnetic circuit unit having a magnet, a plate and a yoke.

3. An electro-mechanical and acoustic transducer according to claim 1, wherein said driving unit has an exciting coil which is disposed on a periphery of a center pole of said magnetic circuit unit including a plate having said center pole at its center part and a magnet at its peripheral part and a magnetic substance which is disposed so as to be opposed to said magnetic circuit unit with a gap therebetween.

4. An electro-mechanical and acoustic transducer according to claim 2, wherein said weight is disposed on a peripheral portion of said yoke.

5. An electro-mechanical and acoustic transducer according to claim 3, wherein said weight is disposed on a peripheral portion of said plate.

6. An electro-mechanical and acoustic transducer according to claim 1, wherein said weight is made of a material having a specific gravity higher than at least iron.

7. An electro-mechanical and acoustic transducer according to claim 2, wherein said yoke includes a magnetic flux passing portion substantially forming a magnetic path of a magnetic circuit of said magnetic circuit unit and a weight portion substantially not forming the magnetic pat of said magnetic circuit.

8. An electro-mechanical and acoustic transducer according to claim 2, wherein said magnetic circuit unit has a rectangular periphery.

9. An electro-mechanical and acoustic transducer according to claim 3, wherein said magnetic circuit unit has a rectangular periphery.

10. An electro-mechanical and acoustic transducer according to claim 2, wherein said magnetic gap has a gap length width larger than a maximum irregular radial moving of said voice coil or said moving unit.

11. An electro-mechanical and acoustic transducer comprising:
- a diaphragm;
- a magnetic circuit unit forming a magnetic path having a magnetic gap therein, constituting a moving unit and disposed opposing to said diaphragm;
- at least two suspensions for holding said moving unit;
- a first suspension of said at least two suspensions having a pair of fixing portions and fixed therewith to the diaphragm side of said magnetic circuit unit;
- a second suspension of said at least two suspensions having another pair of fixing portions and fixed therewith to opposite diaphragm side of said magnetic unit, so that fixing portions of said first suspension are fixed on receiving seats in each other different positions in diagonal direction relation from fixing portions of said second suspension on a plan view seen from a direction of a normal line to the diaphragm;
- a holding member for holding said diaphragm and said suspensions, said holding member having two openings and four receiving seats, said four receiving seats receiving to fix said fixing portions of said first and second suspensions;
- a voice coil fixed to said diaphragm and operably inserted in aid magnetic gap for generating an electromagnetic driving force to interactively operate between said diaphragm and said magnetic circuit unit; and
- a baffle disposed at one of said openings.

12. An electro-mechanical and acoustic transducer according to claim 11, wherein said suspensions comprise:
- arm portions each being connected to said fixing portion, shaped for substantially extending along external shape of said magnetic circuit unit and having resilience; and
- holding portions each being connected to said arm portions and holding said magnetic circuit unit.

13. An electro-mechanical and acoustic transducer according to claim 11, wherein said magnetic circuit unit has a circular periphery and said suspensions have an arcing arm portion.

14. An electro-mechanical and acoustic transducer comprising:
- a diaphragm;
- a magnetic circuit unit forming a magnetic path having a magnetic gap therein and disposed so as to be operably opposed to said diaphragm;
- a moving unit constituted by said magnetic circuit unit;
- a holding member for operably holding said diaphragm;
- at least one suspension including at least two arms for suspending said moving unit, each of said arms having a thin plate shape in which a central portion is smaller in width than end portions to be fixed to said moving unit and said holding member; and
- a driving unit for generating an electromagnetic driving force to interactively operate between said diaphragm and said magnetic circuit unit.

15. An electro-mechanical and acoustic transducer according to claim 14, wherein each of said arms has a thin plate shape in which its width substantially continuously decreases from said end portions to said central portion.

16. An electro-mechanical and acoustic transducer according to claim 15, wherein each of said arms has a thin plate shape in which its width linearly and continuously decreases from said end portions to said central portion.

17. An electro-mechanical and acoustic transducer according to claim 15, wherein said central portion has a uniform width smaller than the width of said end portions.

18. An electro-mechanical and acoustic transducer according to claim 12, wherein said magnetic circuit unit has a shape substantially coinciding with a shape when said suspensions is at a maximum permissible amplitude of said magnetic circuit unit.

19. An electro-mechanical and acoustic transducer according to claim 11, wherein said holding member has a rectangular shape, said receiving portions in a diagonal positional relationship are rectangular and have the same height and said receiving portions in each other adjacent positional relationship have different heights.

20. An electro-mechanical and acoustic transducer according to claim 11, wherein a distance between the periphery of said magnetic circuit unit and said baffle or said holding member is smaller than a distance between said voice coil and said magnetic circuit unit.

21. An electro-mechanical and acoustic transducer unit comprising:
- an electro-mechanical and acoustic transducer; including:
  - a diaphragm;
  - a magnetic circuit unit forming a magnetic path having a magnetic gap therein and disposed so as to be operably opposed to said diaphragm;
  - a weight which is provided integral with or separated from said magnetic circuit unit and does not form a substantial part of said magnetic path;
  - said magnetic circuit unit and said weight constituting a moving unit;
  - at least one suspension for holding said moving unit;
  - a holding member for operably holding said diaphragm and said suspension; and
  - a driving unit for generating an electromagnetic driving force to interactively operate between said diaphragm and said magnetic circuit unit;
- an electric signal generator for outputting to said electro-mechanical and acoustic transducer at least two electric signals having a different frequency or frequency range; and
- a switch for switching the at least two electric signals to said electro-mechanical and acoustic transducer.

22. An electro-mechanical and acoustic transducer unit according to claim 21, wherein said electric signal generator generates an electric signal to produce vibration for informing an incoming call and an electric signal to produce sound for informing an incoming call.

23. An electro-mechanical and acoustic transducer unit according to claim 21, wherein said electric signal generator generates an electric signal to produce vibration for informing an incoming call, an electric signal to produce sound for informing an incoming call and an electric signal to produce received voice.

24. An electro-mechanical and acoustic transducer unit according to claim 22, wherein frequency of said electric signal to produce vibration for informing an incoming call is substantially around 130 Hz.

25. An electro-mechanical and acoustic transducer unit according to claim 23, wherein frequency of said electric signal to produce vibration for informing an incoming call is substantially around 130 Hz.

26. An electro-mechanical and acoustic transducer unit according to claim 23, wherein frequency of said electric signal to produce sound for informing an incoming call is 1 kHz or higher.

27. An electro-mechanical and acoustic transducer unit according to claim 23, wherein frequency of said electric signal to produce sound for informing an incoming call is 1 kHz or higher.

28. An electro-mechanical and acoustic transducer unit according to claim 23, wherein frequency of said electric signal to produce an received voice is substantially 200 Hz or higher.

29. An electro-mechanical and acoustic transducer unit according to claim 21, wherein frequency of electric signal or center frequency of frequency band generated by said electric signal generator is selected to coincide with resonance frequency of mechanical vibration system of said electro-mechanical and acoustic transducer.

30. An electro-mechanical and acoustic transducer unit according to claim 21, wherein frequency of electric signal or center frequency of frequency band generated by said electric signal generator is selected to coincide with resonance frequency of vibration of said diaphragm.

31. An electro-mechanical and acoustic transducer, comprising:
  an electro-mechanical and acoustic transducer including:
    a diaphragm;
    a magnetic circuit unit forming a magnetic path having a magnetic gap therein and disposed so as to be operably opposed to said diaphragm;
    a weight which is provided integral with or separated from said magnetic circuit unit and does not form a substantial part of said magnetic path;
    said magnetic circuit unit and said weight constituting a moving unit;
    at least one suspension for holding said moving unit;
    a holding member for operably holding said diaphragm and said suspension; and
    a driving unit for generating an electromagnetic driving force to interactively operate between said diaphragm and said magnetic circuit unit;
  a detector for detecting a resonance frequency of said electro-mechanical and acoustic transducer; and
  an electric signal generator for outputting to said electro-mechanical and acoustic transducer an electric signal having said resonance frequency detected by said detector.

32. An electro-mechanical and acoustic transducer unit comprising:
  an electro-mechanical and acoustic transducer including:
    a diaphragm;
    a magnetic circuit unit forming a magnetic path having a magnetic gap therein and disposed so as to be operably opposed to said diaphragm;
    a weight which is provided integral with or separated from said magnetic circuit unit and does not form a substantial part of said magnetic path;
    said magnetic circuit unit and said weight constituting a moving unit;
    at least one suspension for holding said moving unit;
    a holding member for operably holding said diaphragm and said suspension; and
    a driving unit for generating an electromagnetic driving force to interactively operate between said diaphragm and said magnetic circuit unit;
  an electric signal generator for outputting an electric signal including a resonance frequency of said electro-mechanical and acoustic transducer;
  a detector for detecting a signal at a resonance frequency of said electro-mechanical and acoustic transducer; and
  an amplifier for amplifying an input signal from said detector and outputting an amplified signal to said electro-mechanical and acoustic transducer.

33. An electro-mechanical and acoustic transducer unit according to claim 32, further comprising a low-pass filter provided between said detector and said amplifier and passing at least one signal having said resonance frequency.

34. An electro-mechanical and acoustic transducer unit according to claim 32, further comprising a high-pass filter provided between said detector and said amplifier and passing at least one signal having said resonance frequency.

35. An electro-mechanical and acoustic transducer unit according to claim 32, further comprising a band-pass filter provided between said detector and said amplifier and passing at least one signal having said resonance frequency.

36. An electro-mechanical and acoustic transducer unit according to claim 32, further comprising a limiter disposed at output terminal of said detector and limiting output signal of said detector.

37. An electro-mechanical and acoustic transducer unit comprising:
  an electro-mechanical and acoustic transducer including:
    a diaphragm;
    a magnetic circuit unit forming a magnetic path having a magnetic gap therein and disposed so as to operably opposed to said diaphragm;
    a weight which is provided integral with or separated from said magnetic circuit unit and does not form a substantial part of said magnetic path;
    said magnetic circuit unit and said weight constituting a moving unit;
    at least one suspension for holding said moving unit;
    a holding member for operably holding said diaphragm and said suspension; and
    a driving unit for generating an electromagnetic driving force to interactively operate between said diaphragm and said magnetic circuit unit;
  a detector for detecting a signal at a resonance frequency of said electro-mechanical and acoustic transducer; and
  an amplifier for amplifying a noise and an input signal from said detector and outputting an amplified signal to said electro-mechanical and acoustic transducer.

38. An electro-mechanical and acoustic transducer unit according to claim 37, further comprising a low-pass filter provided between said detector and said amplifier and passing at least one signal having said resonance frequency.

39. An electro-mechanical and acoustic transducer unit according to claim 37, further comprising a high-pass filter provided between said detector and said amplifier and passing at least one signal having said resonance frequency.

40. An electro-mechanical and acoustic transducer unit according to claim 37, further comprising a band-pass filter provided between said detector and said amplifier and passing at least one signal having said resonance frequency.

41. An electro-mechanical and acoustic transducer unit according to claim 37, further comprising a limiter provided at output terminal of said detector and limiting output signal of said detector.

42. An electro-mechanical and acoustic transducer unit comprising:
  an electro-mechanical and acoustic transducer including:
    a diaphragm;
    a magnetic circuit unit forming a magnetic path having a magnetic gap therein and disposed so as to be operably opposed to said diaphragm;
    a weight which is provided integral with or separated from said magnetic circuit unit and does not form a substantial part of said magnetic path;
    said magnetic circuit unit and said weight constituting a moving unit;
    at least one suspension for holding said moving unit;
    a holding member for operably holding said diaphragm and said suspension; and a driving unit for generating an electromagnetic driving force to interactively operate between said diaphragm and said magnetic circuit unit;

an antenna for receiving incoming signals;

a receiving signal processing unit for processing said incoming signals and generating an output signal;

a detector for detecting a signal of a resonance frequency of said electro-mechanical and acoustic transducer; and an amplifier for amplifying a noise and a signal portion of an inputted signal from said detector during the while the output signal from said receiving signal processing unit is given thereto and for outputting an amplified signal to said electro-mechanical and acoustic transducer.

43. An electro-mechanical and acoustic transducer unit according to claim 42, further comprising a low-pass filter provided between said detector and said amplifier and passing at least one signal having said resonance frequency.

44. An electro-mechanical and acoustic transducer unit according to claim 42, further comprising a high-pass filter provided between said detector and said amplifier and passing at least one signal having said resonance frequency.

45. An electro-mechanical and acoustic transducer unit according to claim 42, further comprising a band-pass filter provided between said detector and said amplifier and passing at least one signal having said resonance frequency.

46. An electro-mechanical and acoustic transducer unit according to claim 42, further comprising a limiter provided at output terminal of said detector and limiting output signal of said detector.

47. A portable terminal unit incorporating therein said electro-mechanical and acoustic transducer unit of claim 21.

48. A portable terminal unit incorporating therein said electro-mechanical and acoustic transducer unit of claim 31.

49. A portable terminal unit incorporating therein said electro-mechanical and acoustic transducer unit of claim 32.

50. A portable terminal unit incorporating therein said electro-mechanical and acoustic transducer unit of claim 37.

51. A portable terminal unit incorporating therein said electro-mechanical and acoustic transducer unit of claim 42.

52. A portable terminal unit according to claim 47, wherein said holding member is fixed to an outside case of said portable terminal unit or to a circuit board of said portable terminal unit.

53. An electro-mechanical and acoustic transducer comprising:

a diaphragm;

a magnetic circuit unit forming a magnetic path having a magnetic gap therein and disposed so as to be operably opposed to said diaphragm;

a weight which is provided integral with said magnetic circuit unit and does not form a substantial part of said magnetic path;

said magnetic circuit unit and said weight constituting a moving unit;

at least one suspension for suspending said moving unit;

a holding member for operably holding said diaphragm and said suspension; and a driving unit for generating an electromagnetic driving force to interactively operate between said diaphragm and said magnetic circuit unit.

54. An electro-mechanical and acoustic transducer according to claim 53, wherein said driving unit is a voice coil which is fixed to said diaphragm and operably inserted in a magnetic gap formed in said magnetic circuit unit having a magnet, a plate and a yoke.

55. An electro-mechanical and acoustic transducer according to claim 53, wherein said driving unit has an exciting coil which is disposed on a periphery of a center pole of said magnetic circuit unit including a plate having said center pole at its center part and a magnet at its peripheral part and a magnetic substance which is disposed so as to be opposed to said magnetic circuit unit with a gap therebetween.

56. An electro-mechanical and acoustic transducer according to claim 54, wherein said weight is disposed on a peripheral portion of said yoke.

57. An electro-mechanical and acoustic transducer according to claim 55, wherein said weight is disposed on a peripheral portion of said plate.

58. An electro-mechanical and acoustic transducer according to claim 53, wherein said weight is made of a material having a specific gravity higher than at least iron.

59. An electro-mechanical and acoustic transducer according to claim 54, wherein said yoke includes a magnetic flux passing portion substantially forming a magnetic path of a magnetic circuit of said magnetic circuit unit and a weight portion substantially not forming the magnetic path of said magnetic circuit.

60. An electro-mechanical and acoustic transducer according to claim 54, wherein said magnetic circuit unit has a rectangular periphery.

61. An electro-mechanical and acoustic transducer according to claim 55, wherein said magnetic circuit unit has a rectangular periphery.

62. An electro-mechanical and acoustic transducer according to claim 54, wherein said magnetic gap has a gap length width larger than a maximum irregular radial moving to said voice coil or said moving unit.

63. An electro-mechanical and acoustic transducer comprising:

a diaphragm;

a magnetic circuit unit forming a magnetic path having a magnetic gap therein and disposed so as to be operably opposed to said diaphragm;

a weight which is separated from but mechanically firmly fixed to said magnetic circuit unit and does not form a substantial part of said magnetic path;

said magnetic circuit unit and said weight constituting a moving unit;

at least one suspension for suspending said moving unit;

a holding member for operably holding said diaphragm and said suspension; and a driving unit for generating an electromagnetic driving force to interactively operate between said diaphragm and said magnetic circuit unit.

64. An electro-mechanical and acoustic transducer according to claim 63, wherein said driving unit is a voice coil which is fixed to said diaphragm and operably inserted in a magnetic gap formed in said magnetic circuit unit having a magnet, a plate and a yoke.

65. An electro-mechanical and acoustic transducer according to claim 63, wherein said driving unit has an exciting coil which is disposed on a periphery of a center pole of said magnetic circuit unit including a plate having said center pole at its center part and a magnet at its peripheral part and a magnetic substance which is disposed so as to be opposed to said magnetic circuit unit with a gap therebetween.

66. An electro-mechanical and acoustic transducer according to claim 64, wherein said weight is disposed on a peripheral portion of said yoke.

67. An electro-mechanical and acoustic transducer according to claim 65, wherein said weight is disposed on a peripheral portion of said plate.

68. An electro-mechanical and acoustic transducer according to claim 63, wherein said weight is made of a material having a specific gravity higher than at least iron.

69. An electro-mechanical and acoustic transducer according to claim 64, wherein said yoke includes a magnetic flux passing portion substantially forming a magnetic path of a magnetic circuit of said magnetic circuit unit and a weight portion substantially not forming the magnetic path of said magnetic circuit.

70. An electro-mechanical and acoustic transducer according to claim 64, wherein said magnetic circuit unit has a rectangular periphery.

71. An electro-mechanical and acoustic transducer according to claim 65, wherein said magnetic circuit unit has a rectangular periphery.

72. An electro-mechanical and acoustic transducer according to claim 64, wherein said magnetic gap has a gap length width larger than a maximum irregular radial moving of said voice coil or said moving unit.

73. An electro-mechanical and acoustic transducer according to claim 1, wherein said diaphragm vibrates at an audible frequency, thereby generating sound.

74. An electro-mechanical and acoustic transducer according to claim 14, wherein said diaphragm vibrates at an audible frequency, thereby generating sound.

75. An electro-mechanical and acoustic transducer according to claim 53, wherein said diaphragm vibrates at an audible frequency, thereby generating sound.

76. An electro-mechanical and acoustic transducer according to claim 63, wherein said diaphragm vibrates at a audible frequency, thereby generating sound.

* * * * *

UNITED STATES PATENT AND TRADEMARK OFFICE
CERTIFICATE OF CORRECTION

PATENT NO. : 6,208,237 B1
DATED : March 27, 2001
INVENTOR(S) : Saiki et al.

It is certified that error appears in the above-identified patent and that said Letters Patent is hereby corrected as shown below:

Column 13,
Line 6, replace the reference "∞m" with -- µ m --.

Column 24,
Line 34, replace "i" with -- in --.
Line 56, replace "pat" with -- path --

Column 25,
Line 25, repalce "aid" with -- said --.

Column 26,
Line 61, replace "23" with -- 22 --.

Signed and Sealed this

First Day of January, 2002

Attest:

JAMES E. ROGAN
Attesting Officer        Director of the United States Patent and Trademark Office